United States Patent
Guerdrum et al.

(10) Patent No.: US 10,392,043 B2
(45) Date of Patent: Aug. 27, 2019

(54) CART

(71) Applicant: OTTER PRODUCTS, LLC, Fort Collins, CO (US)

(72) Inventors: Jonathan H. Guerdrum, Fort Collins, CO (US); Douglas A. Kempel, Fort Collins, CO (US); Alex S. Breeden, Fort Collins, CO (US)

(73) Assignee: Otter Products, LLC, Fort Collins, CO (US)

( * ) Notice: Subject to any disclaimer, the term of this patent is extended or adjusted under 35 U.S.C. 154(b) by 77 days.

(21) Appl. No.: 15/864,227

(22) Filed: Jan. 8, 2018

(65) Prior Publication Data
US 2018/0201290 A1 Jul. 19, 2018

Related U.S. Application Data

(60) Provisional application No. 62/448,218, filed on Jan. 19, 2017, provisional application No. 62/500,369, filed on May 2, 2017.

(51) Int. Cl.
| | | |
|---|---|---|
| *B62B 3/10* | (2006.01) | |
| *B62B 3/02* | (2006.01) | |
| *B62B 3/00* | (2006.01) | |
| *B62B 3/04* | (2006.01) | |
| *B62B 5/06* | (2006.01) | |
| *B62B 3/12* | (2006.01) | |
| *B62B 5/00* | (2006.01) | |

(52) U.S. Cl.
CPC .............. *B62B 3/04* (2013.01); *B62B 3/10* (2013.01); *B62B 3/12* (2013.01); *B62B 5/0083* (2013.01); *B62B 5/06* (2013.01); *B62B 5/067* (2013.01); *B62B 2202/12* (2013.01); *B62B 2203/44* (2013.01); *B62B 2204/06* (2013.01)

(58) Field of Classification Search
CPC .......... B62B 3/02; B62B 1/002; B62B 1/008; B62B 1/12; B62B 1/125; B62B 1/14; B62B 3/04
See application file for complete search history.

(56) References Cited

U.S. PATENT DOCUMENTS 2,469,242 A * 5/1949 Pohl .......................... B62B 3/02
    280/651
2,534,367 A * 12/1950 Perrotta ............... A45C 13/385
    211/49.1

(Continued)

OTHER PUBLICATIONS

Igloo, Trailmate webpage, available at https://www.igloocoolers.com/00034157-trailmate-charcoal-acid-green, downloaded Feb. 20, 2017.

(Continued)

*Primary Examiner* — James A Shriver, II
*Assistant Examiner* — Vaughn Coolman

(57) ABSTRACT

A cart for transporting an object, such as a storage container or a cooler for storing food and/or beverages, is provided. The cart includes a securing member to attach the cart to the storage container. The securing member includes first and second clasps each formed from a resilient material and configured to engage respective first and second securing members of the storage container. The first and second clasp are configured to resiliently flex away from the storage container to receive the storage container.

20 Claims, 45 Drawing Sheets

(56) References Cited

U.S. PATENT DOCUMENTS

| | | | | |
|---|---|---|---|---|
| 3,515,077 A * | 6/1970 | Glowacki | ............... | A47B 1/08 108/83 |
| 3,874,531 A * | 4/1975 | Mayo | ...................... | B60D 1/00 280/47.35 |
| 4,451,053 A * | 5/1984 | Alioa | ........................ | B62B 1/18 280/47.26 |
| 4,676,536 A * | 6/1987 | Arbic | ........................ | E05C 19/004 248/354.1 |
| 4,679,817 A * | 7/1987 | Schufer | .................. | B62B 1/125 280/47.27 |
| 4,976,448 A * | 12/1990 | Wickersham | ............ | B62B 1/10 280/47.2 |
| 5,193,842 A | 3/1993 | Fontenot | | |
| 5,249,823 A * | 10/1993 | McCoy | .................... | B62B 3/02 280/144 |
| 5,261,562 A * | 11/1993 | Prout | .................... | B65F 1/1468 220/771 |
| D358,921 S * | 5/1995 | Abbema | ........................ | D34/24 |
| 5,427,393 A * | 6/1995 | Kriebel | .................... | B62B 1/14 280/47.131 |
| 5,538,267 A * | 7/1996 | Pasin | .................... | A63H 33/003 280/47.35 |
| 5,553,824 A * | 9/1996 | Dutra, Jr. | ............. | A47B 23/002 108/93 |
| 5,669,617 A * | 9/1997 | Pasin | ...................... | B62B 3/007 280/147 |
| 5,806,878 A | 9/1998 | Mroczka et al. | | |
| 5,988,658 A * | 11/1999 | Ritchie | ............... | A45C 13/385 280/47.17 |
| 6,010,145 A * | 1/2000 | Liu | ......................... | B62B 3/022 220/6 |
| 6,109,644 A * | 8/2000 | Cox | ......................... | B62B 1/20 280/47.24 |
| 6,193,247 B1 * | 2/2001 | Spear | ........................ | B62B 3/16 280/33.998 |
| 6,315,310 B1 * | 11/2001 | Hurt | ........................ | B62B 1/264 206/373 |
| 6,328,179 B1 | 12/2001 | Conrado et al. | | |
| D455,585 S * | 4/2002 | West | ........................ | D6/705.7 |
| 6,371,497 B1 * | 4/2002 | Scire | .................... | B62B 5/0083 280/42 |
| 6,471,237 B1 * | 10/2002 | Bedsole | .................... | B62B 1/12 280/47.26 |
| 6,536,796 B1 * | 3/2003 | Solomon | ................... | B62B 3/02 280/47.34 |
| D488,959 S | 4/2004 | Tyrer | | |
| 6,783,147 B1 * | 8/2004 | Green, Sr. | ................ | B62B 1/20 280/47.26 |
| 6,923,468 B1 * | 8/2005 | Barnett | .................... | B62B 3/04 280/35 |
| 7,178,812 B1 * | 2/2007 | Bryan | ...................... | B62B 1/14 280/248 |
| 7,322,586 B1 | 1/2008 | Zettel | | |
| 7,954,830 B2 * | 6/2011 | Begin | ...................... | B62B 3/04 280/47.35 |
| 8,251,379 B2 * | 8/2012 | Watzke | .................. | B62B 1/125 280/35 |
| D707,008 S * | 6/2014 | Mericle | ........................ | D34/26 |
| 8,944,459 B1 * | 2/2015 | Hagy | ...................... | B62B 3/02 280/47.34 |
| 9,139,212 B2 * | 9/2015 | Nobles | .................... | B62B 1/262 |
| 9,415,786 B1 | 8/2016 | Lorrigan | | |
| 9,415,787 B2 * | 8/2016 | Mericle | .................... | B62B 3/02 |
| 9,550,508 B1 * | 1/2017 | Parra | ........................ | B62B 3/10 |
| 9,694,838 B2 * | 7/2017 | Gullino | .................... | B62B 3/001 |
| 9,738,298 B1 * | 8/2017 | Yang | ........................ | B62B 3/025 |
| 9,758,184 B1 * | 9/2017 | Vaverek | .................... | B62B 1/20 |
| 9,771,093 B2 * | 9/2017 | Horowitz | ............... | B62B 3/025 |
| 9,845,125 B1 * | 12/2017 | Liu | ........................ | B62B 3/00 |
| D823,064 S | 7/2018 | Eichinger et al. | | |
| D823,065 S | 7/2018 | Eichinger et al. | | |
| D823,066 S | 7/2018 | Eichinger et al. | | |
| 10,053,129 B1 * | 8/2018 | Turner, Jr. | ............ | B62B 5/0083 |
| 10,054,354 B1 * | 8/2018 | Kennedy | ................. | B62B 1/208 |
| 2002/0125668 A1 * | 9/2002 | Sims | ........................ | B62B 1/18 280/47.26 |
| 2002/0140190 A1 * | 10/2002 | Shapiro | .................... | B62B 1/206 280/39 |
| 2003/0042711 A1 * | 3/2003 | Hsu | ........................ | A45C 5/146 280/651 |
| 2006/0237928 A1 * | 10/2006 | Vanderberg | ............ | B62B 1/006 280/35 |
| 2007/0045974 A1 * | 3/2007 | Young | ...................... | B65F 1/02 280/47.26 |
| 2008/0001373 A1 | 1/2008 | Vaughn | | |
| 2009/0026735 A1 * | 1/2009 | Watzke | ................... | B62B 1/125 280/652 |
| 2010/0133784 A1 * | 6/2010 | Shalaby | .................... | B62B 3/12 280/482 |
| 2012/0212116 A1 * | 8/2012 | McRorie | .................... | B62B 3/02 312/249.13 |
| 2013/0168933 A1 * | 7/2013 | Watzke | ................... | B62B 1/125 280/47.26 |
| 2013/0270795 A1 * | 10/2013 | Tyson | ...................... | B63C 13/00 280/414.2 |
| 2015/0021106 A1 | 1/2015 | LaRosa | | |
| 2015/0115555 A1 * | 4/2015 | Cates | .................... | B62B 5/0089 280/47.26 |
| 2015/0203292 A1 * | 7/2015 | Huff | ........................ | B65F 1/14 220/86.1 |
| 2018/0156516 A1 * | 6/2018 | Vanderberg | ............ | A45C 5/14 |
| 2018/0186547 A1 | 7/2018 | Morine et al. | | |
| 2018/0186550 A1 | 7/2018 | Morine et al. | | |

OTHER PUBLICATIONS

Rambler Wheels, Rambler X2 webpage, available at: http://www.ramblerwheels.com/collections/products/products/rambler-x2, downlaoded Feb. 20, 2017.

Rambler Wheels, Rambler X2LT webpage, available at http://www.ramblerwheels.com/collections/products/products/rambler-x21t, downloaded Feb. 20, 2017.

ROVR, Campr webpage, available at http://www.rovrproducts.com/product/7321592259, downloaded Feb. 20, 2017.

* cited by examiner

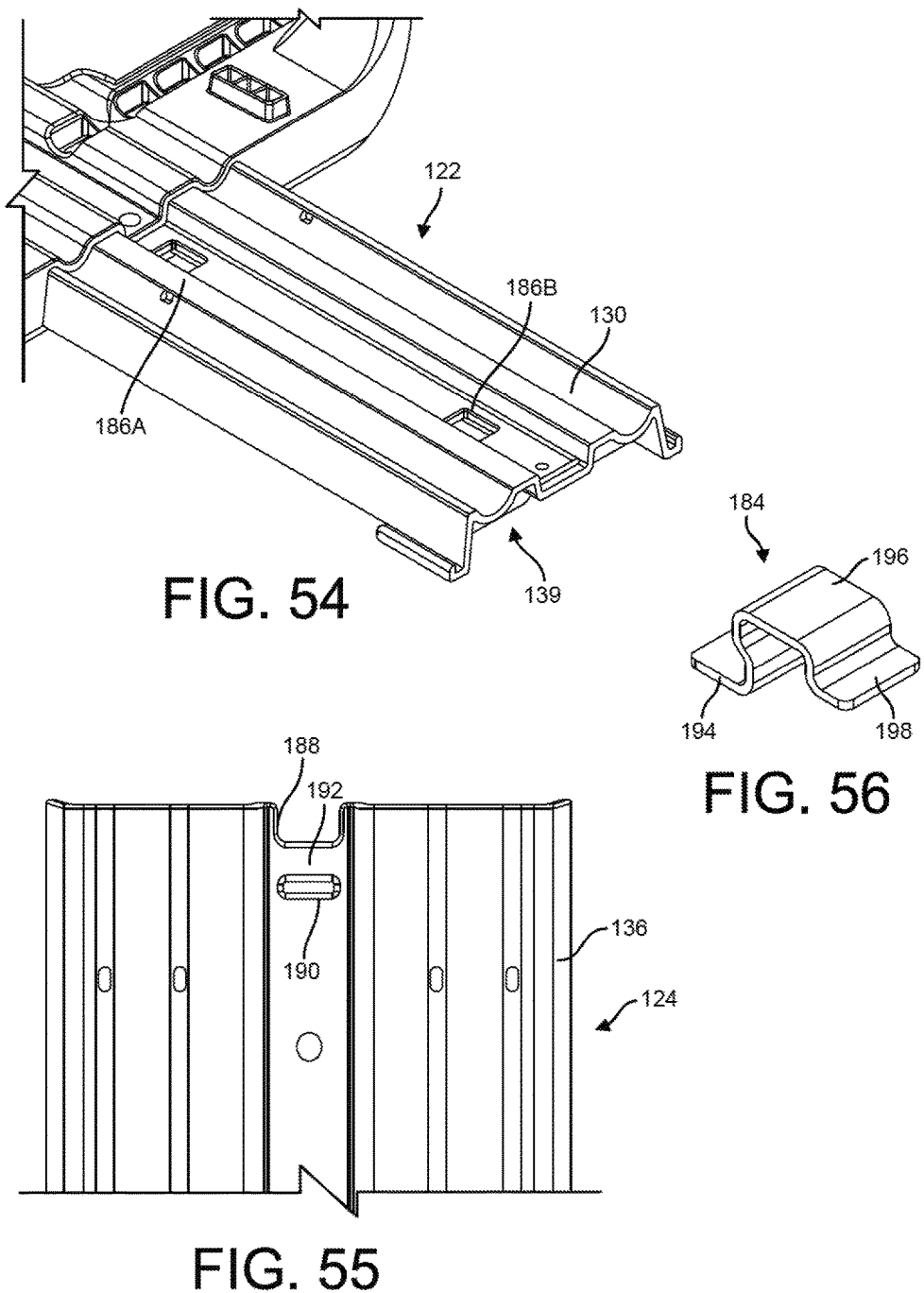

CART

CROSS REFERENCE TO RELATED APPLICATIONS

This application is related to U.S. Provisional Application Nos. 62/448,218 filed Jan. 19, 2017, and 62/500,369 filed May 2, 2017, the disclosures of each of which are hereby incorporated by reference in their entirety.

FIELD OF THE DISCLOSURE

This disclosure relates generally to a cart for transporting an object, such as a storage container or a cooler for storing food and/or beverages.

BACKGROUND

When participating in many leisure activities, it is often desired to bring along food or beverages for consumption before, during, and/or after the activity. Often, the food may be perishable and the ambient temperature may be high (for instance, at a beach location), so it is desired to keep the perishable food in a temperature-controlled environment to avoid spoiling. Similarly, beverages (such as canned or bottled beverages) may also be consumed, and it is desired to keep such beverages cool until consumption. Typically, a cooler or other storage container may be used to transport the food and beverages. Exemplary coolers are disclosed in U.S. patent application Ser. No. 15/398,486, filed Jan. 4, 2017, and U.S. patent application Ser. No. 15/494,020, filed Apr. 21, 2017, the disclosures of each of which are hereby incorporated by reference in their entirety.

Typically, food and beverage items are placed in the interior portion a cooler, where they are kept cool by the inclusion of ice and/or cooling packs in the interior of the cooler. However, the weight of the contents of the cooler or storage container may be relatively high. In addition, the size of the cooler or storage container may be relatively large and bulky. The size and weight of the cooler or storage container may make it difficult for the cooler to be transported, particularly by a single person or over a relatively long distance. There is therefore a need to provide an improved way of transporting the cooler or storage container.

BRIEF SUMMARY OF THE DISCLOSURE

A cart for transporting an object, such as a storage container or a cooler for storing food and/or beverages, is provided. In one exemplary embodiment, the cart includes a lower member and an upper member including a surface configured to support the object. One of the lower member and the upper member includes a first channel, a second channel, and a third channel, and the other of the lower member and the upper member includes a ridge configured to be removeably positioned in either the first channel or the second channel. The cart further includes a wheel assembly configured to be removably positioned in the second channel when the ridge is positioned in the first channel and removably positioned in the third channel when the ridge is positioned in the second channel.

In one exemplary embodiment, a securing member for attaching a storage container to an object is provided. The securing member includes a first clasp formed from a resilient material and configured to engage a first securing member of the storage container, the first clasp including a first retaining latch configured to engage a first securing member of the storage container to releasably attach the object to the storage container and a first recess adjacent to the first retaining latch, the first recess configured to receive the first securing member when the object is attached to the storage container; and a second clasp formed from a resilient material, the second clasp configured to engage a second securing member of the storage container, the second clasp including a second retaining latch configured to engage a second securing member of the storage container to releasably attach the object to the storage container and a second recess adjacent to the second retaining latch, the second recess configured to receive the second securing member when the object is attached to the storage container. The first clasp and the second clasp are configured to resiliently flex away from the storage container to receive the storage container.

In one exemplary embodiment, a cart for transporting an object, such as a storage container or a cooler for storing food and/or beverages, is provided. The cart includes a first member including a first wheel and a second wheel and a second wheel, the first member further including at least one support surface positioned at least partially between the first wheel and the second wheel for supporting the object when the object is placed on the cart; a second member including a ground contacting member, at least one of the first member and the second member including a first aperture and a second aperture and the other of the first member and the second member including a third aperture; and a fastener, the fastener configured to be received within the first aperture and the third aperture to secure the first member to the second member in a first configuration of the cart and to be received within the second aperture and the third aperture to secure the first member to the second member in a second configuration of the cart, the first configuration of the cart having a shorter distance between the first wheel and the ground contacting member than the second configuration of the cart.

A cart for transporting an object, such as a storage container or a cooler for storing food and/or beverages, is provided. In one exemplary embodiment, the cart includes a handle having a first end connected to a second end by a length member, the length member including a curved portion, and the second end including a plurality of extensions extending away from the length member; and a handle attachment portion, the handle attachment portion including a receiver formed from a resilient material and configured to releasably attach the first end of the handle in a first configuration.

Various other embodiments and variations of the apparatuses, methods, and systems are also disclosed. While multiple embodiments are disclosed, still other embodiments will become apparent to those skilled in the art from the following detailed description and figures, which describe and show illustrative embodiments of the invention. As will be realized, the invention is capable of modifications in various aspects, all without departing from the scope of the present invention. Accordingly, the drawings and detailed description are to be regarded as illustrative in nature and not restrictive.

BRIEF DESCRIPTION OF THE DRAWINGS

FIG. 54 illustrates a perspective view of another exemplary first portion of a cart;

FIG. 55 illustrates a top view of another exemplary second portion of a cart;

FIG. 56 illustrates a connector for connecting the first portion of FIG. 54 with the second portion of FIG. 55;

DETAILED DESCRIPTION

In the following detailed description, various specific details are set forth in order to provide an understanding of and describe the apparatuses and techniques introduced here. However, the techniques may be practiced without the specific details set forth in these examples. Various alternatives, modifications, and/or equivalents will be apparent to those skilled in the art without varying from the spirit of the introduced apparatuses and techniques. For example, while the embodiments described herein refer to particular features, the scope of this solution also includes embodiments having different combinations of features and embodiments that do not include all of the described features. Accordingly, the scope of the techniques and solutions introduced herein are intended to embrace all such alternatives, modifications, and variations as fall within the scope of the claims, together with all equivalents thereof. Therefore, the description should not be taken as limiting the scope of the invention, which is defined by the claims.

Figure 1:
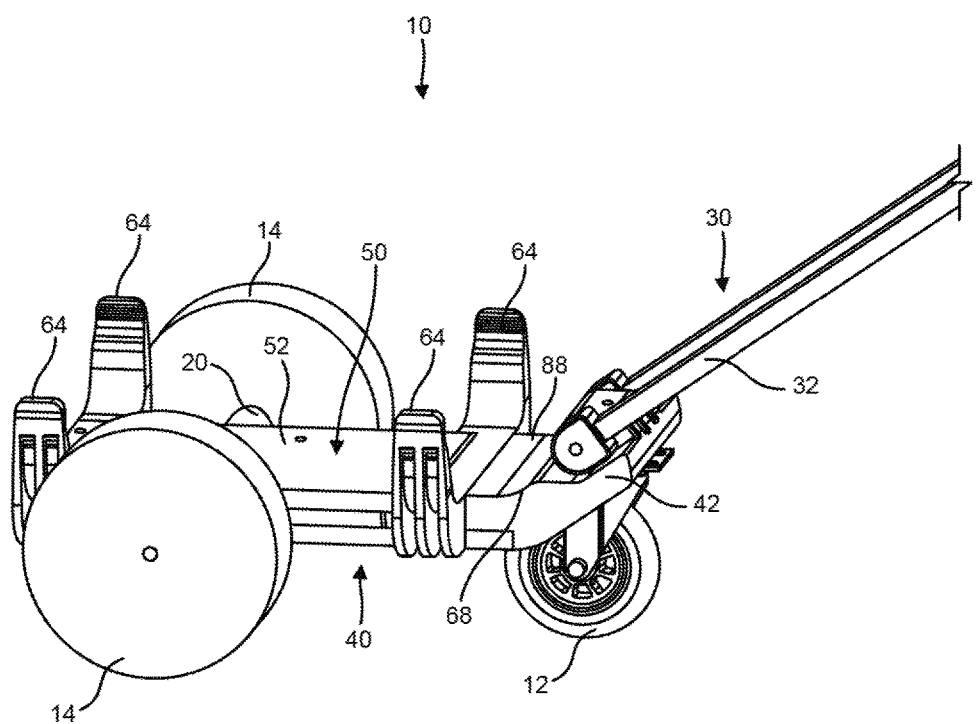
FIG. 1 is a perspective view of an exemplary cart for transporting an object such as a storage container or a cooler.
Figure 2:
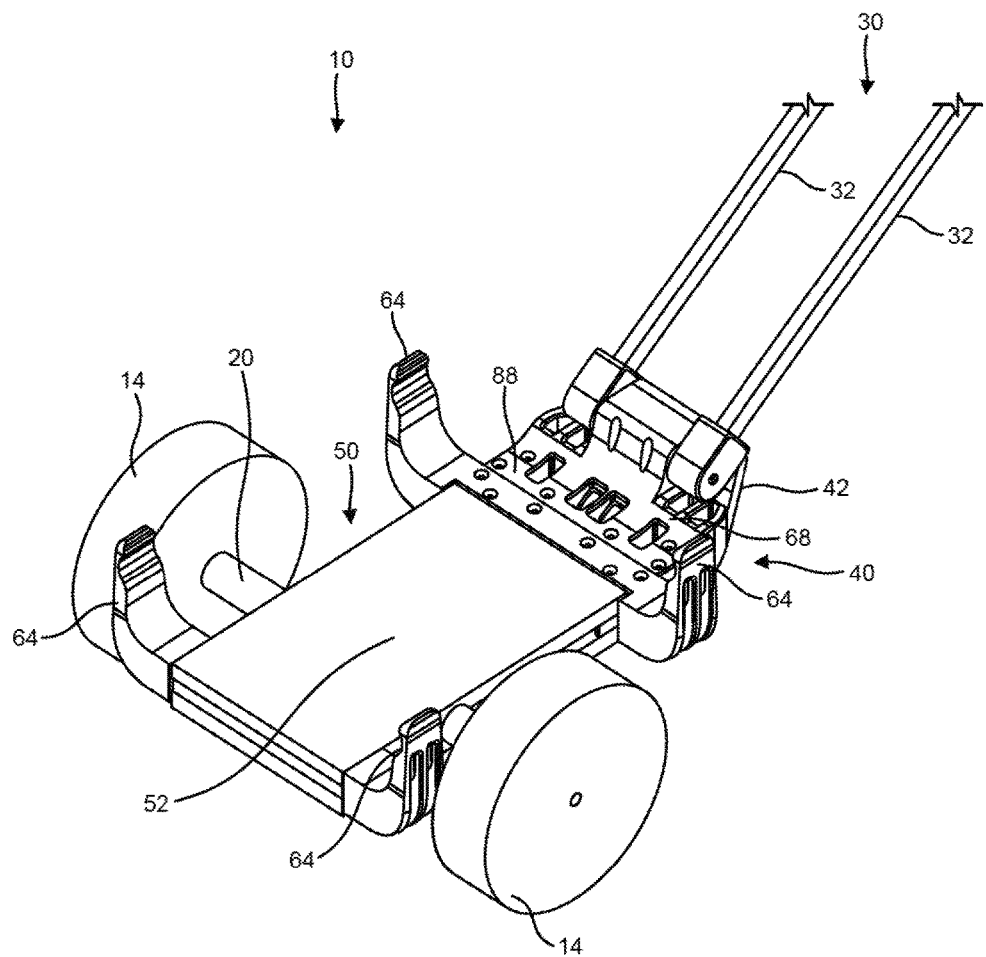
FIG. 2 is a rear perspective view of the cart of FIG. 1.
Figure 3:
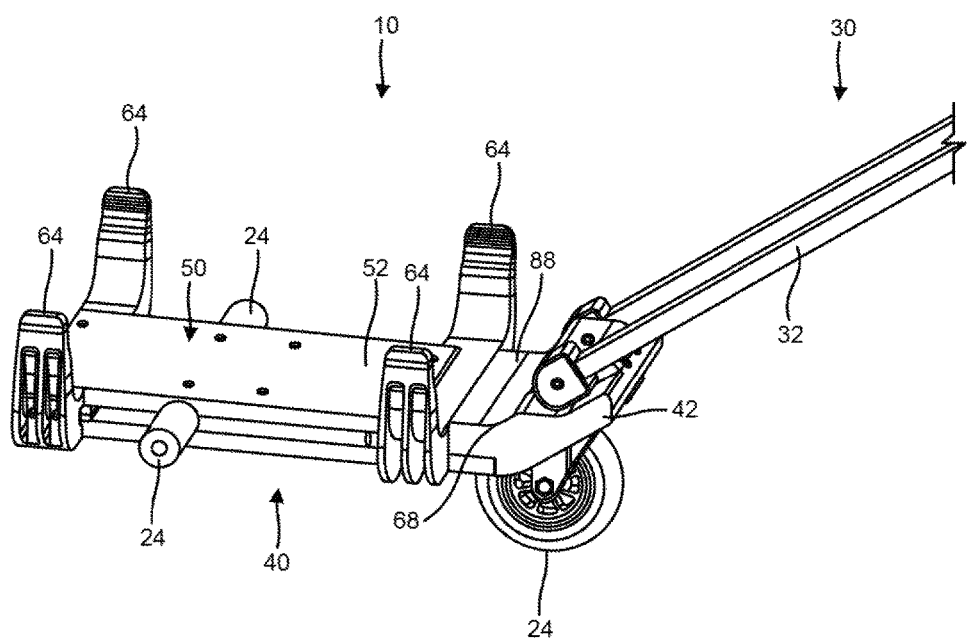
FIG. 3 is a front perspective view of the cart of FIG. 1 with the rear wheels removed.
Figure 4:
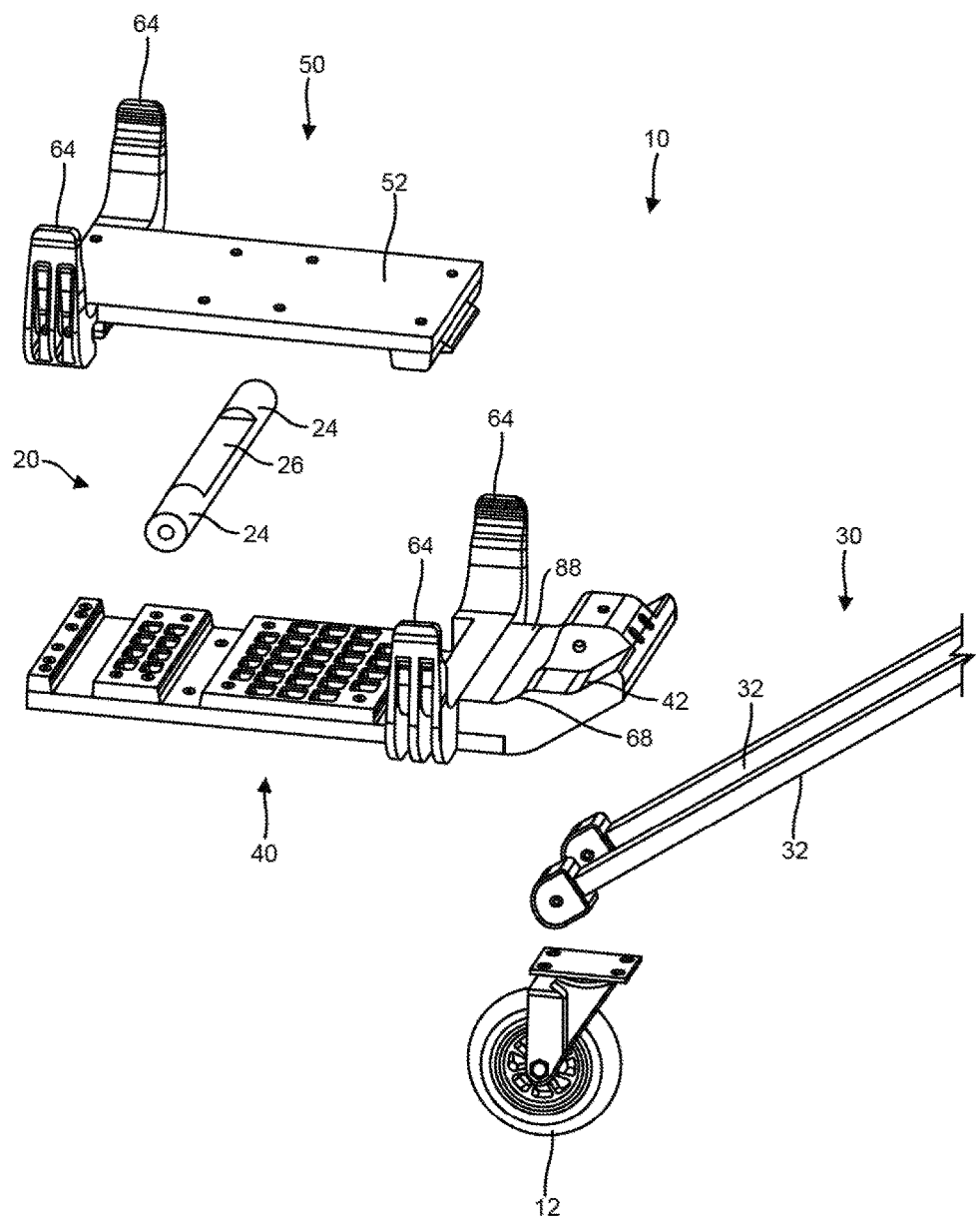
FIG. 4 is an exploded view of the cart of FIG. 3.
Figure 5:
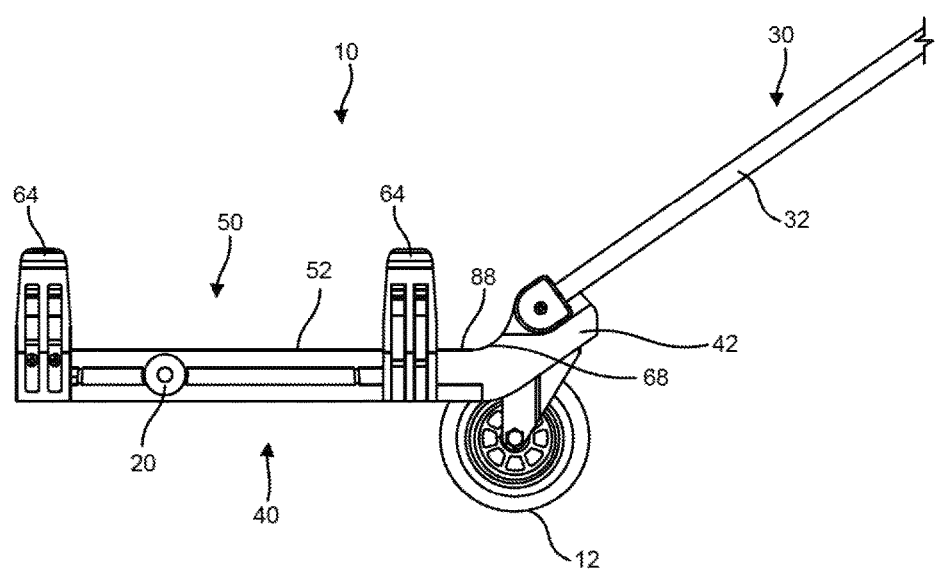
FIG. 5 is a side view of the cart of FIG. 3.
Figure 6:
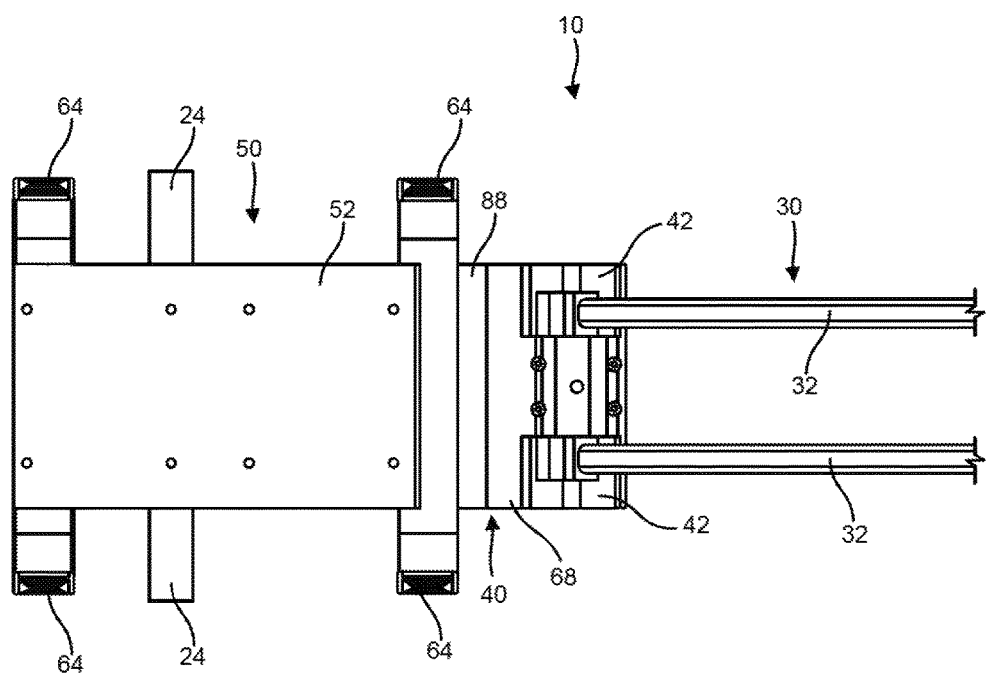
FIG. 6 is a top view of cart of FIG. 3.
Figure 7:
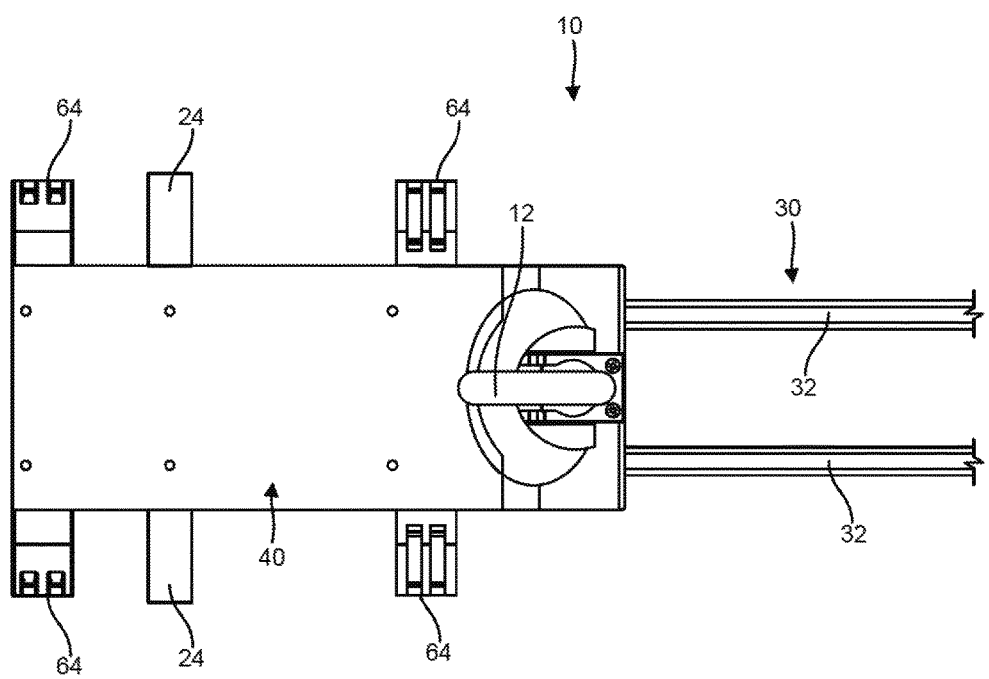
FIG. 7 is a bottom view of the cart of FIG. 3.
Figure 8:
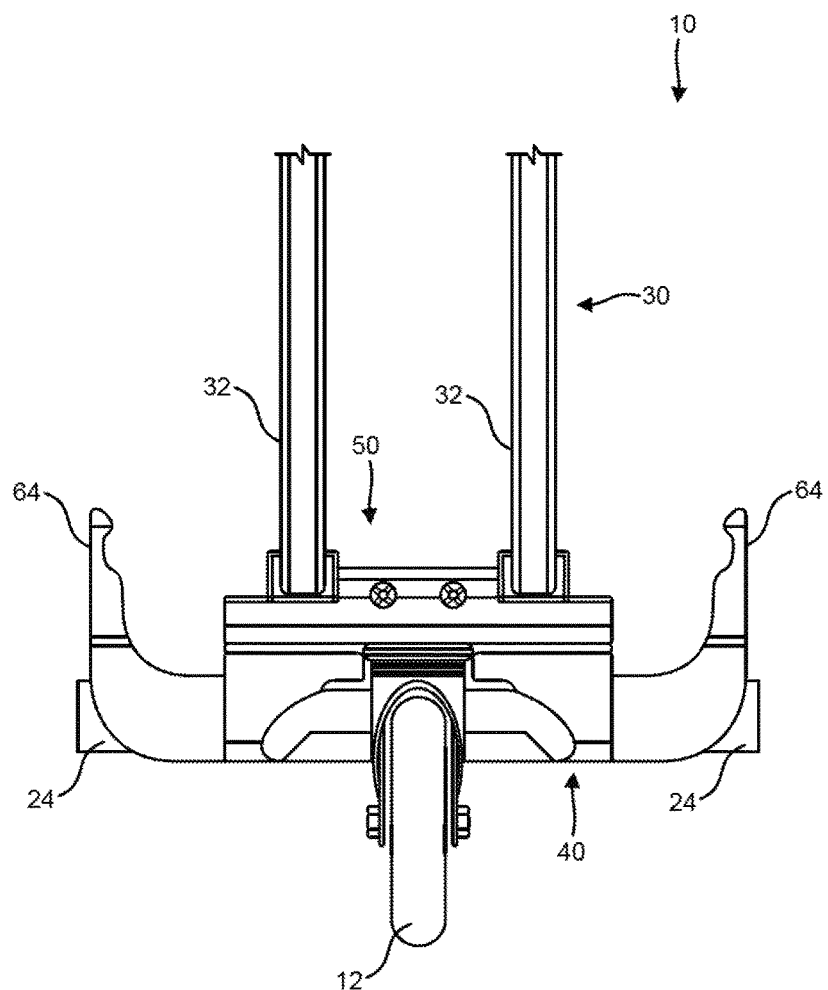
FIG. 8 is a front view of the cart of FIG. 3.
Figure 9:
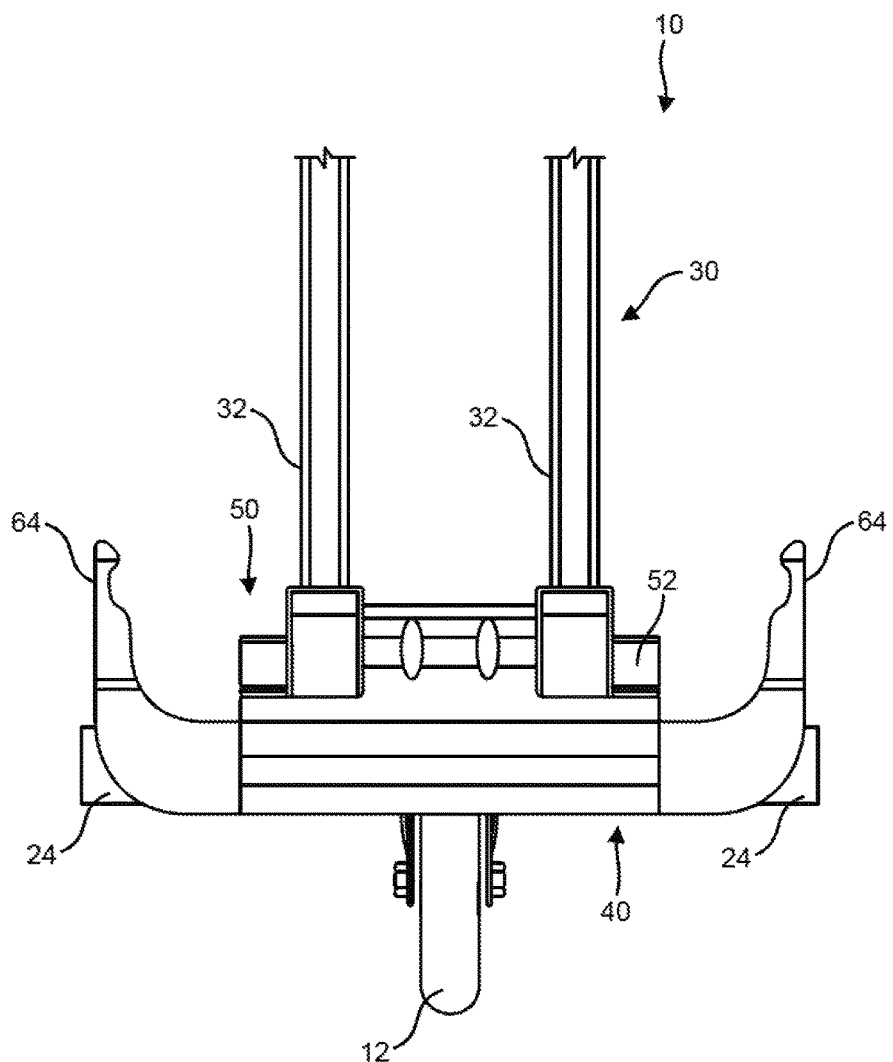
FIG. 9 is a rear view of the cart of FIG. 3.

Referring first to FIGS. 1-2, an exemplary cart 10 is illustrated. Cart 10 includes one or more front wheels 12 and one or more rear wheels 14. FIGS. 3-9 illustrate various views of the cart 10 of FIG. 1 with the rear wheels 14 removed. FIG. 3 illustrates an exploded view of the cart 10. FIG. 4 illustrates a side view of the cart 10. FIG. 6 illustrates a top view of the cart 10. FIG. 7 illustrates a bottom view of the cart 10. FIG. 8 illustrates a front view of the cart 10. FIG. 9 illustrates a back view of the cart 10.

Although illustrated in FIG. 1 as including only a single front wheel 12, in other embodiments, cart 10 may include two or more front wheels 12. In some embodiments, front wheel 12 may be a caster wheel, such as illustrated in FIG. 1. The use of a caster for front wheel 12 allows cart 10 to have a relatively small turning radius compared to other wheel types.

Figure 10:
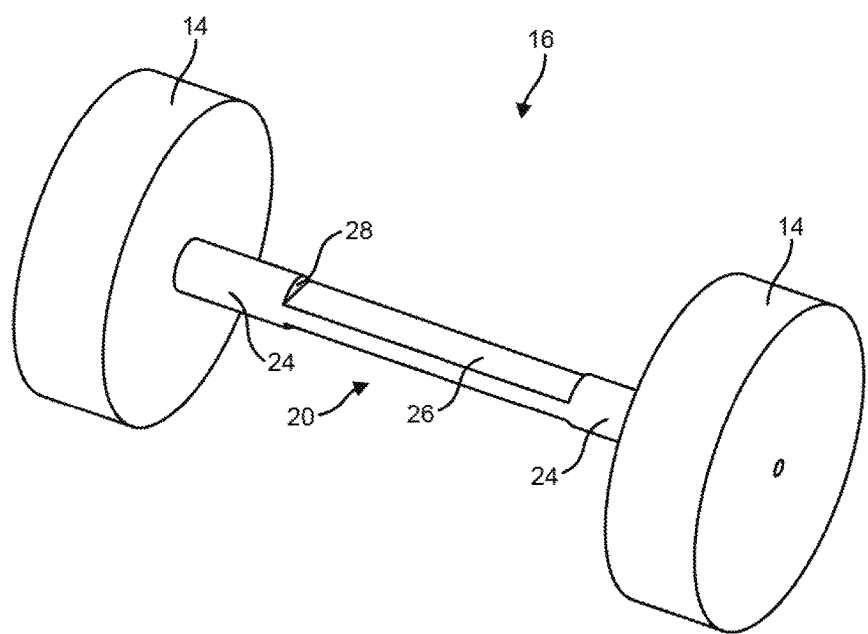
FIG. 10 is a perspective view of an exemplary wheel assembly.
Figure 11:
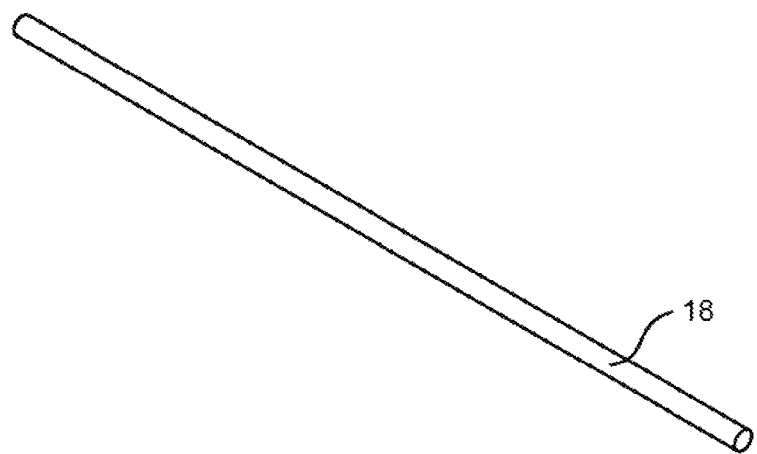
FIG. 11 is a perspective view of an exemplary axle.

In some embodiments, the rear wheels 14 are part of a rear wheel assembly 16, as shown in FIG. 10. In some embodiments, the rear wheels 14 are larger than front wheel 12. The rear wheel assembly 16 includes an axle 18 (FIG. 11) extending through axle support 20 and connecting rear wheels 14. In some embodiments, rear wheels 14 rotate around fixed axle 18. In other embodiments, rear wheels 14 are rotatably fixed to axle 18, which rotates within axle support 20.

Figure 12:
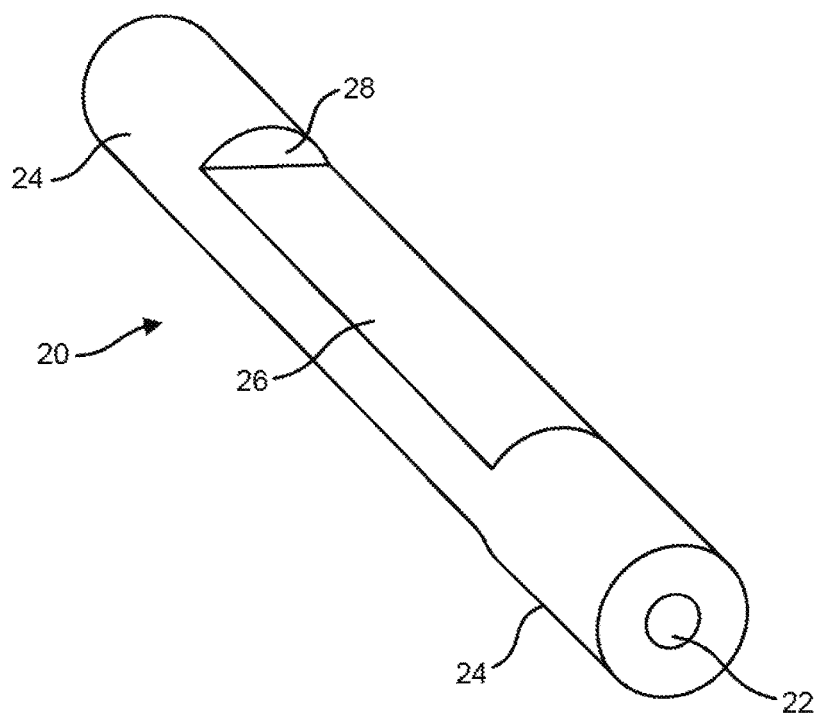
FIG. 12 is a perspective view of an exemplary axle support.

Referring to FIG. 12, axle support 20 includes an aperture 22 extending through axle support 20 into which axle 18 is received. Axle support 20 further includes edge portions 24 and central portion 26. As illustrated in FIG. 12, edge portions 24 are substantially cylindrical in shape and central portion 28 is substantially rectangular in shape, although other suitable shapes may also be used. An interface edge 28 is formed where the shape of axle support 20 changes between the central portion 28 and each edge portion 24. In the illustrated embodiment, the interface edge 28 between the central portion 26 and the edge portions 24 prevents lateral movement of axle support 20 when axle support 20 is positioned between lower member 40 and upper member 50.

Figure 13:
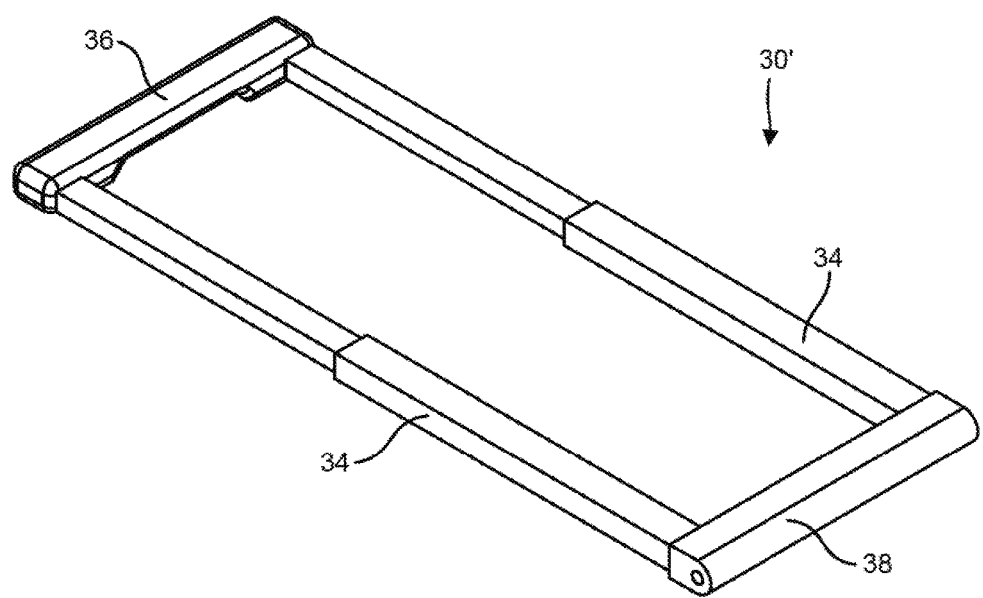
FIG. 13 is a perspective view of an exemplary handle.

Referring again to FIGS. 1-9, cart 10 includes a handle 30 for a user to pull and steer the cart 10. Any suitable handle may be used. As illustrated in FIGS. 1-9, the handle 30 includes one or more bars 32 pivotably attached to cart 10, such as to lower portion 40 of cart 10. Another exemplary handle 30' is illustrated in FIG. 13. Handle 30' includes two telescoping bars 34 attached by a handle crossbar 36 at a first end and a second crossbar 38 at a second end. Second crossbar 38 may be pivotably attached to lower member 40. The use of telescoping bars 34 allows the handle to have a reduced length for storage. In some embodiments, the rotation relative to lower portion 32 allows handle 30 or 30' to lie relatively flat against the cart 10 in a storage position when a cooler or other storage container is not attached. In some embodiments, lower portion 32 includes a lip 42 that stops handle 30 or handle 30' from rotating in a first direction to allow a user to pull the cart 10, and allows handle 30 or 30' to be rotated in a second direction to lie flat against surface 52 of upper portion 50.

Figure 14:
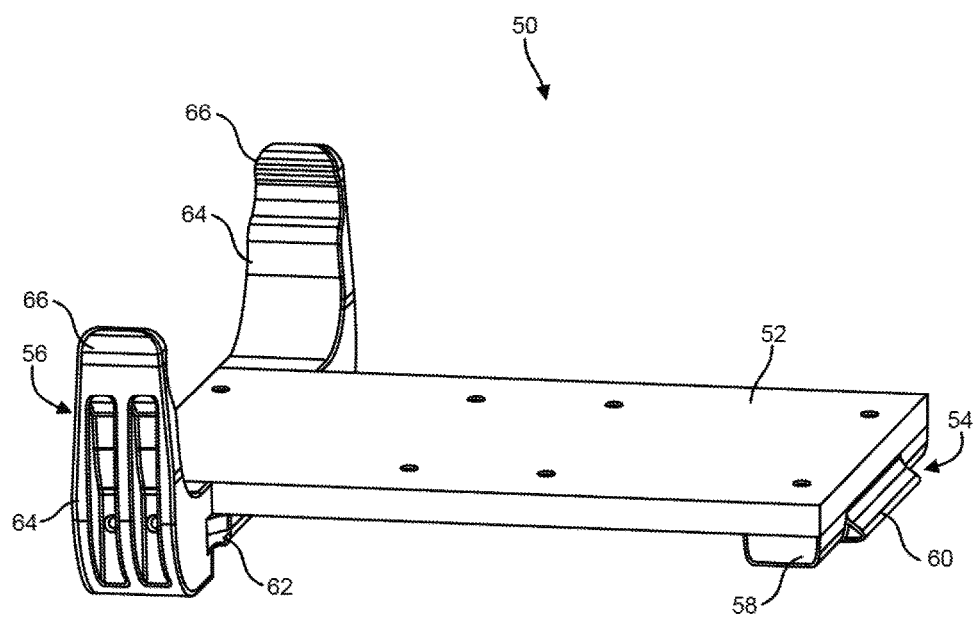
FIG. 14 is a perspective view of an exemplary upper member of the cart of FIG. 3.
Figure 15:
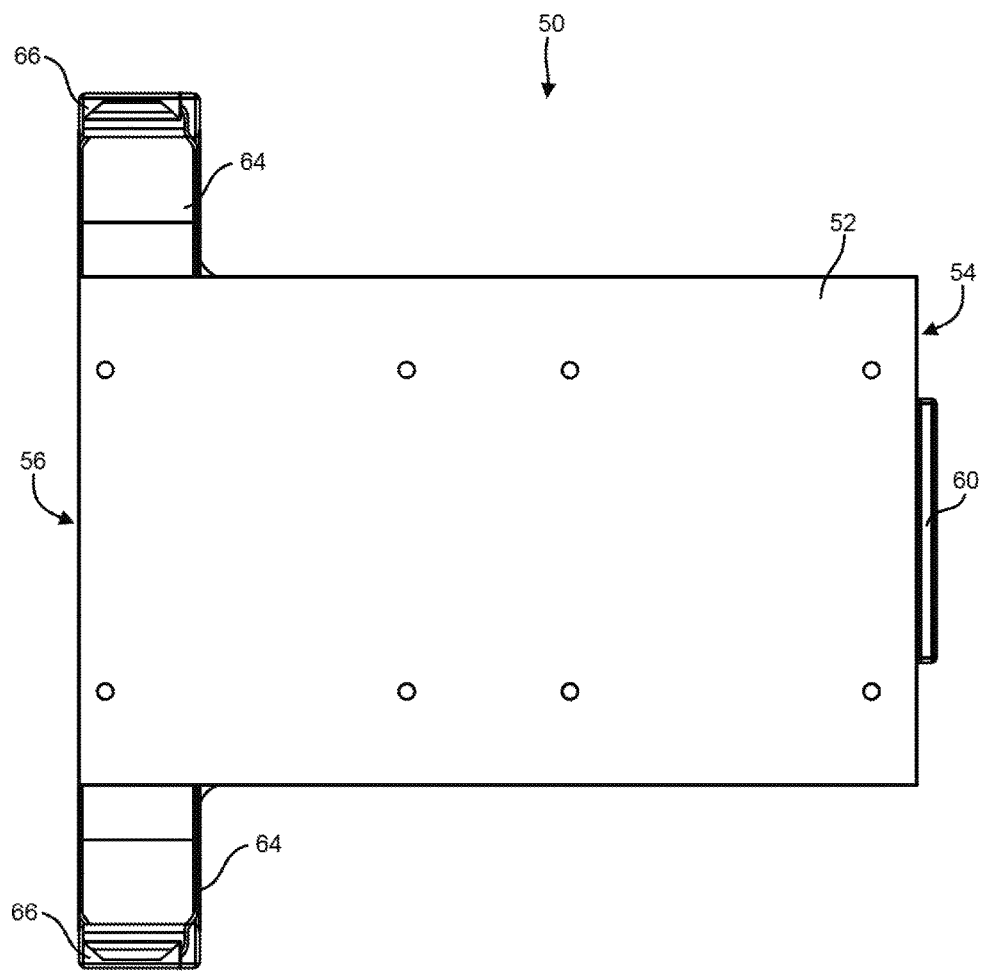
FIG. 15 is a top view of the upper member of FIG. 14.
Figure 16:
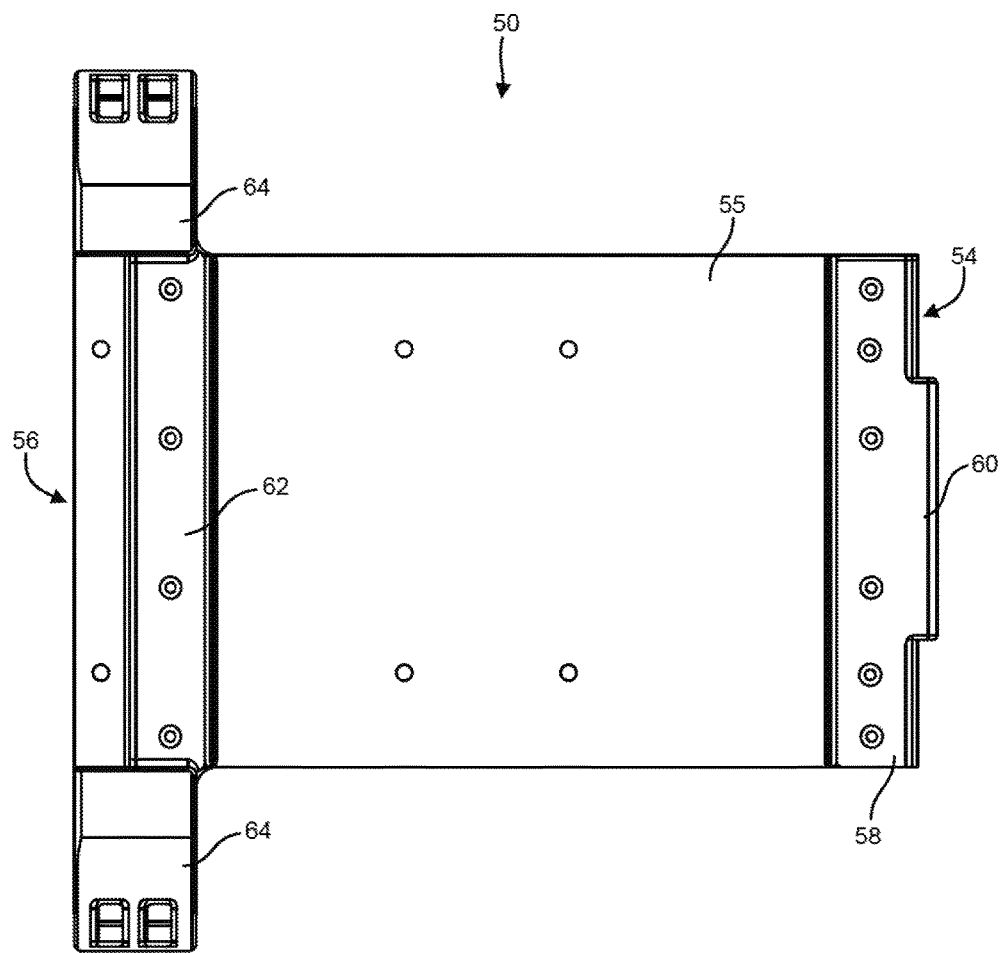
FIG. 16 is a bottom view of the upper member of FIG. 14.
Figure 17:
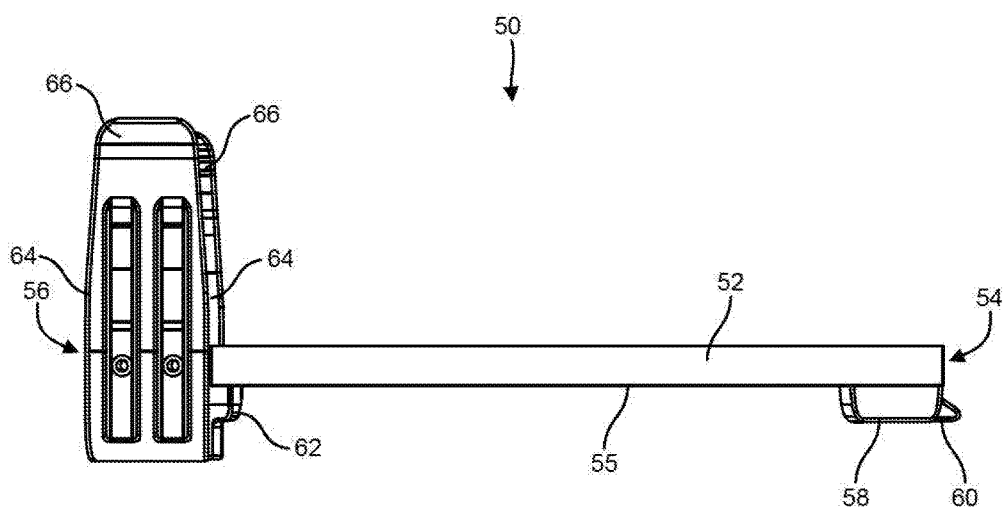
FIG. 17 is a side view of the upper member of FIG. 14.

Referring next to FIGS. 14-17, an exemplary upper member 50 of cart 10 is illustrated. FIG. 14 is an elevated perspective view of upper member 50. FIG. 15 is a top view of upper member 50. FIG. 16 is a bottom view of upper member 50. FIG. 17 is a side view of upper member 50.

Upper member 50 includes a surface 52 extending between a front portion 54 and a rear portion 56. In some exemplary embodiments, upper member 50 is formed form a plastic material, such as polypropylene. In some exemplary embodiments, surface 52 is substantially flat to support a bottom surface of a cooler, such as cooler 90 or cooler 90' (see FIGS. 22, 25), or other container. In other exemplary embodiments, surface 52 has a profile other than substantially flat.

Front portion 54 of upper member 50 includes ridge 58. A front engagement portion, such as ridge 58, extends from a lower surface 55 (FIG. 16) of the front portion 54 of upper member 50. Ridge 58 is illustratively received by a channel, such as channel 70 or channel 78, of lower member 40 as described in more detail below. Although FIGS. 14-17 illustrate upper member 50 as including ridge 58 and FIGS. 18-21 illustrate lower member 40 as including channels 70, 78, 84, in other embodiments, upper member 50 includes one or more of channels 70, 78, 84 and lower member 40 includes engagement portion 58.

A tongue 60 extends from ridge 58. In some exemplary embodiments, tongue 60 has a substantially triangular prism shape, although other suitable geometries, such as a rectangular prism may also be used. Tongue 60 is illustratively received within a groove, such as groove 76 in communication with channel 70 or groove 80 in communication with channel 78, when ridge 58 is received within first channel 70 or second channel 78. In some exemplary embodiments, ridge 58 and tongue 60 cooperate with groove 76 and channel 70 or groove 80 and channel 78 to define a changeable overall length of the cart 10.

Rear portion 54 of upper member 50 includes rear engagement portion, such as ridge 62 extending from lower surface 55 of the rear portion 54. In some exemplary embodiments, ridge 62 may be configured to be received by a channel, such as channel 84, of lower member 40 in a first configuration as described in more detail below, and configured to be positioned behind raised end stop 86 in a second configuration.

Rear portion 54 further includes lateral supports 64 for securing a cooler, such as cooler 90 or cooler 90' (see FIGS. 22, 25), or other container to the cart 10. Two lateral supports 64 joined together in a substantially "U" shape are illustrated in the rear portion 54 of upper member 50 in FIGS. 14-17. In some exemplary embodiments, the distance between the two lateral supports 64 of the rear portion 54 of upper member 50 may be adjusted to accommodate coolers or other containers of varying widths. In other embodiments, upper member 50 may include only a single lateral support 64 or three or more rear lateral supports 64. In some embodiments, the lateral supports 64 may positioned on upper member 50 in front portion 54 of upper member 50, rear portion 56, between front portion 54 and rear portion 56, or some combination of these positions.

Each lateral support 64 is illustratively formed of a resilient material and includes a clasp 66. In one exemplary embodiment, lateral support 64 is configured to flex outwardly as cart 10 receives the cooler or storage container. Clasp 66 is configured to releasably couple to a corresponding securement feature 92 of the cooler or other container to secure the cooler or other container to cart 10 (see FIGS. 22, 25). Exemplary securement features are disclosed in U.S. patent application Ser. No. 15/398,486, filed Jan. 4, 2017, the disclosures of which are hereby incorporated by reference in their entirety.

Figure 18:
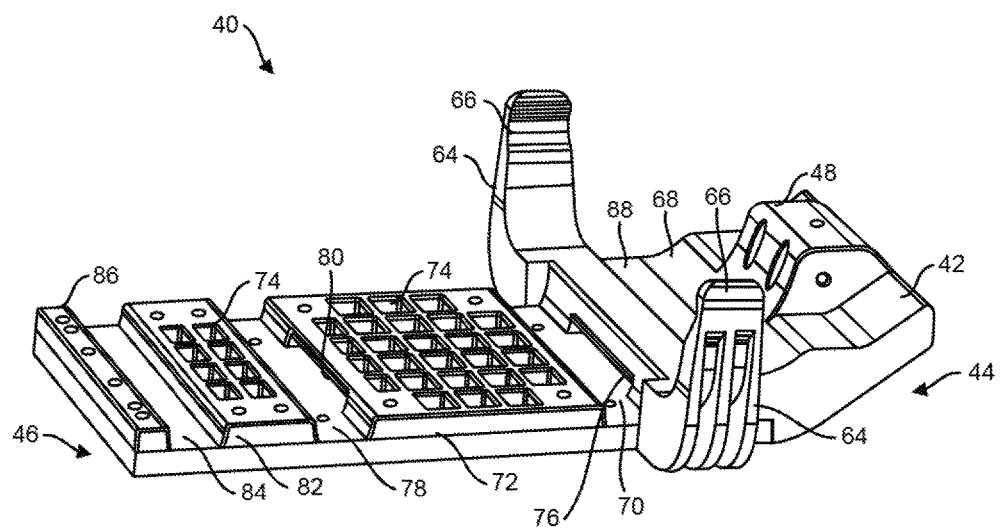
FIG. 18 is a perspective view of an exemplary lower member of the cart of FIG. 3.
Figure 19:
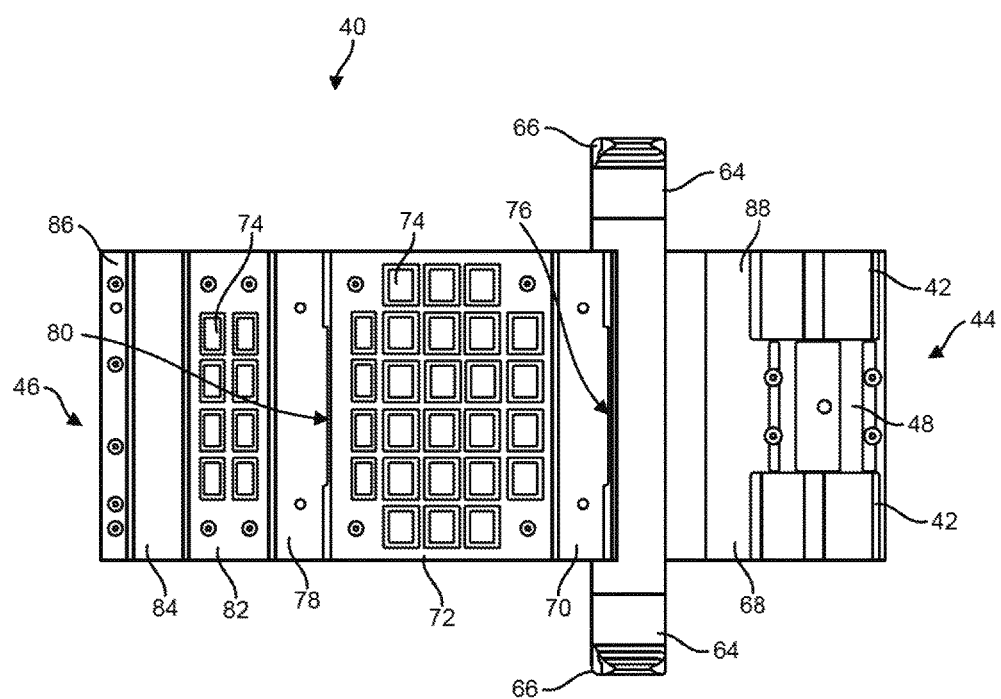
FIG. 19 is a top view of the lower member of FIG. 18.
Figure 20:
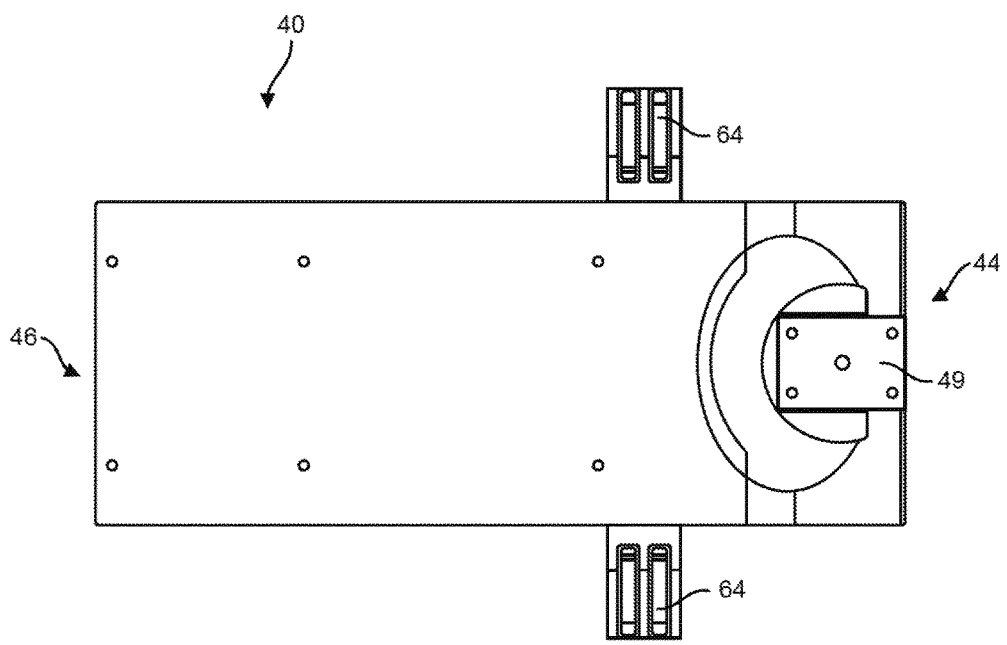
FIG. 20 is a bottom view of the lower member of FIG. 18.
Figure 21:
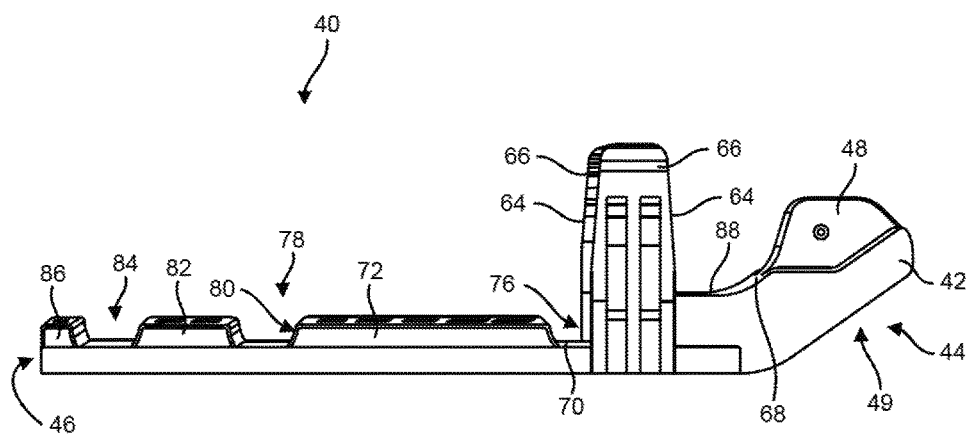
FIG. 21 is a side view of the upper member of FIG. 18.

Referring next to FIGS. 18-21, an exemplary lower member 40 of cart 10 extending between a front portion 44 and a rear portion 46 is illustrated. In some exemplary embodiments, lower member 40 is formed form a plastic material, such as polypropylene. FIG. 18 is an elevated perspective view of lower member 40. FIG. 19 is a top view of lower member 40. FIG. 20 is a bottom view of lower member 40. FIG. 21 is a side view of lower member 40.

Front portion 44 includes handle attachment 48 for connecting handle 30 to lower member 40 and lip 42 that stops handle 30 or handle 30' from rotating in a first direction. As illustrated in FIG. 20, front portion 44 further includes wheel mounting 49 for attaching front wheel 12 to lower member 40.

Referring again to FIGS. 18-21, lower member 40 illustratively includes lateral supports 64 for securing a cooler or other container to the cart 10. Two lateral supports 64 joined together in a substantially "U" shape are illustrated in the front portion 44 of lower member 40 in FIGS. 18-21. In some exemplary embodiments, the distance between the two lateral supports 64 of the front portion 44 of lower member 40 may be adjusted to accommodate coolers or other containers of varying widths. In other embodiments, lower member 40 may include only a single lateral support 64 or three or more rear lateral supports 64. In some embodiments, the lateral supports 64 may be positioned on lower member 40 in front portion 44 of lower member 40, rear portion 46 of lower member 40, between front portion 44 and rear portion 46, or some combination of these positions. Although lateral supports 64 are illustrated on both lower member 40 and upper member 50 in FIGS. 14-21, in other embodiments, only lower member 40 or upper member 50 may include lateral supports 64.

Lower member 40 includes a first channel 70 defined between a front portion 44 and a first raised portion 72. At least a portion of first raised portion 72 may include coring 74 to reduce the amount of material and/or weight of lower member 40. First channel 70 is configured to receive ridge 58 of upper member 50 when the cart 10 is in a first configuration (see FIGS. 22-24). First channel 70 is illustratively connected to first groove 76 configured for receiving tongue 60 of upper member 50 when ridge 58 is received in channel 70.

Lower member 40 includes a second channel 78 defined between first raised portion 72 and a second raised portion 82. At least a portion of second raised portion 82 may include coring 74 to reduce the amount of material and/or weight of lower member 40. Second channel 78 is configured to receive axle support 10 when the cart 10 is in a first configuration (see FIGS. 22-24) and ridge 58 of upper member 50 when the cart 10 is in a second configuration (see FIGS. 25-27). Second channel 78 is illustratively connected to second groove 80 configured for receiving tongue 60 of upper member 50 when ridge 58 is received in channel 78.

Lower member 40 includes a third channel 84 illustratively defined between second raised portion 72 and end stop 86. Third channel 84 is configured to receive ridge 62 of upper member 50 when the cart 10 is in a first configuration (see FIGS. 22-24) and axle support 20 when the cart 10 is in a second configuration (see FIGS. 25-27).

As illustrated in FIGS. 18-21, lower member 40 includes three channels 70, 78, 84 configured for receiving ridge 58, ridge 62, and/or axle support 20. In other embodiments, lower member 40 includes two channels or more than three channels. In some embodiments, lower member 40 includes channels of different sizes, each channel being configured to receive one or more of ridge 58, ridge 62, and/or axle support 20.

Figure 22:
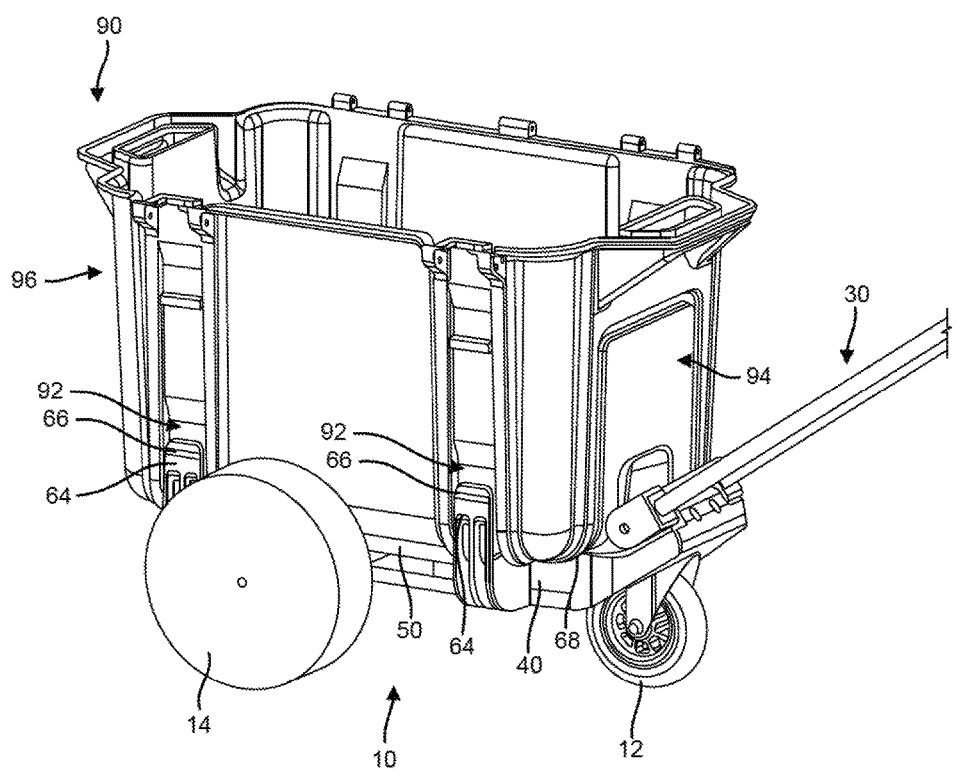
FIG. 22 is a perspective view of an exemplary cart in a first configuration and an attached cooler.
Figure 23:
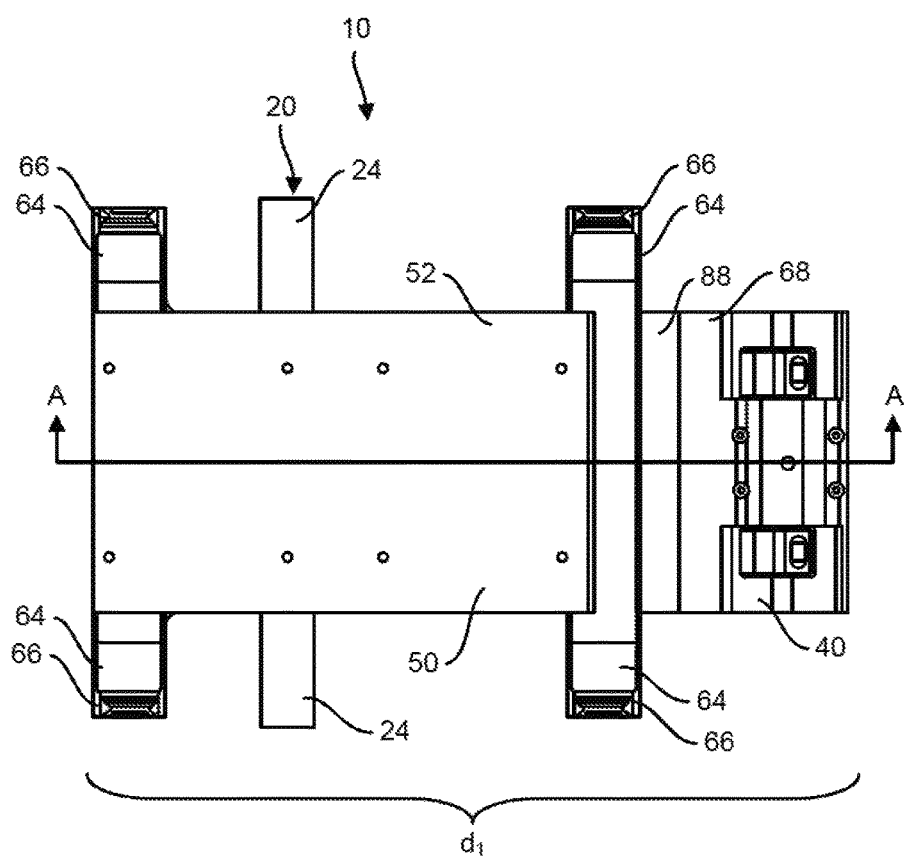
FIG. 23 is a top view of the cart of FIG. 22 in the first configuration without the attached cooler and the rear wheels and handle removed.
Figure 24:
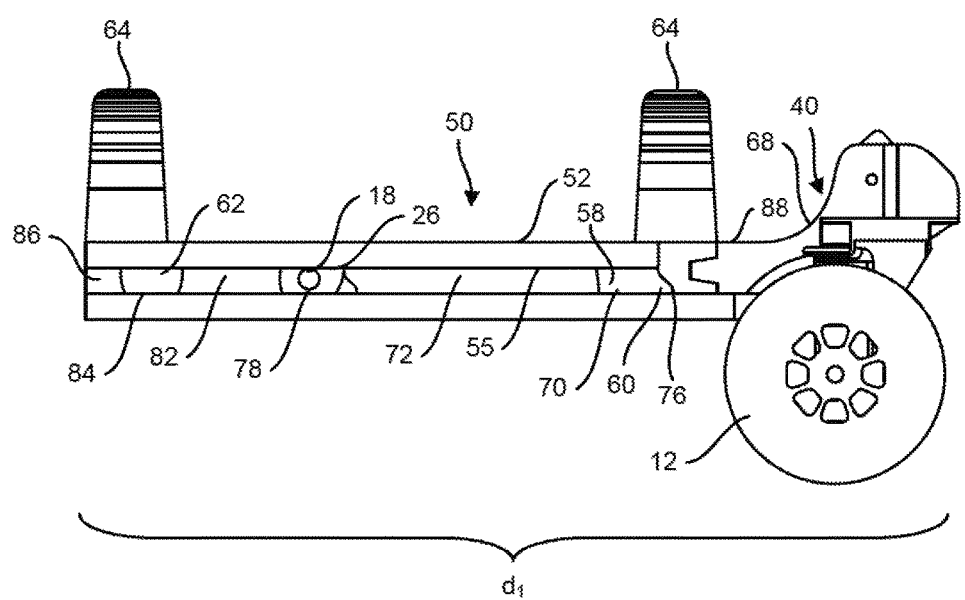
FIG. 24 is a cross-sectional view of the cart in FIG. 23 along the line A-A.

Referring next to FIG. 22, an exemplary cart 10 is illustrated in a first configuration supporting a first cooler 90. Cooler 90 has a length dimension defined between front wall 94 and rear wall 96. FIG. 23 illustrates a top view of the cart 10 in the first configuration without the cooler 90 and with the rear wheels 14 and handle 30 removed. FIG. 24 illustrates a sectional view of the cart 10 in the first configuration along the line A-A in FIG. 23.

Cooler 90 is illustratively supported by surface 52 of upper member 50 and surface 88 of lower member 40. In other embodiments, cooler 90 may be supported by only one of surface 52 and surface 88. Cooler 90 is restricted from moving in a lateral direction by a plurality of lateral supports 64 on cart 10. Cooler 90 is restricted from moving in a forward direction relative to cart 10 by clasps 66 and curved front end 68 of lower member 40. Cooler 90 includes one or more securement features 92 to releasably couple the cooler 90 to a corresponding clasp 66 of cart 10.

In the first configuration illustrated in FIGS. 22-24, the ridge 58 of upper member 50 is received in the first channel 70 of lower member 40, and the tongue 60 of upper member 50 is received within groove 76 of lower member 40. The axle support 20 is received within the second channel 78 of lower member 40 and below bottom surface 55 of upper member 50. The ridge 62 is received within third channel 84 of lower member 40. The lower surface 55 of upper member 50 is illustratively in contact with and supported by the first raised portion 72, the second raised portion 82, and the end stop 86 of lower member 40.

As illustrated in FIGS. 23 and 24, in the first configuration, cart 10 defines a first length $d_1$.

Figure 25:
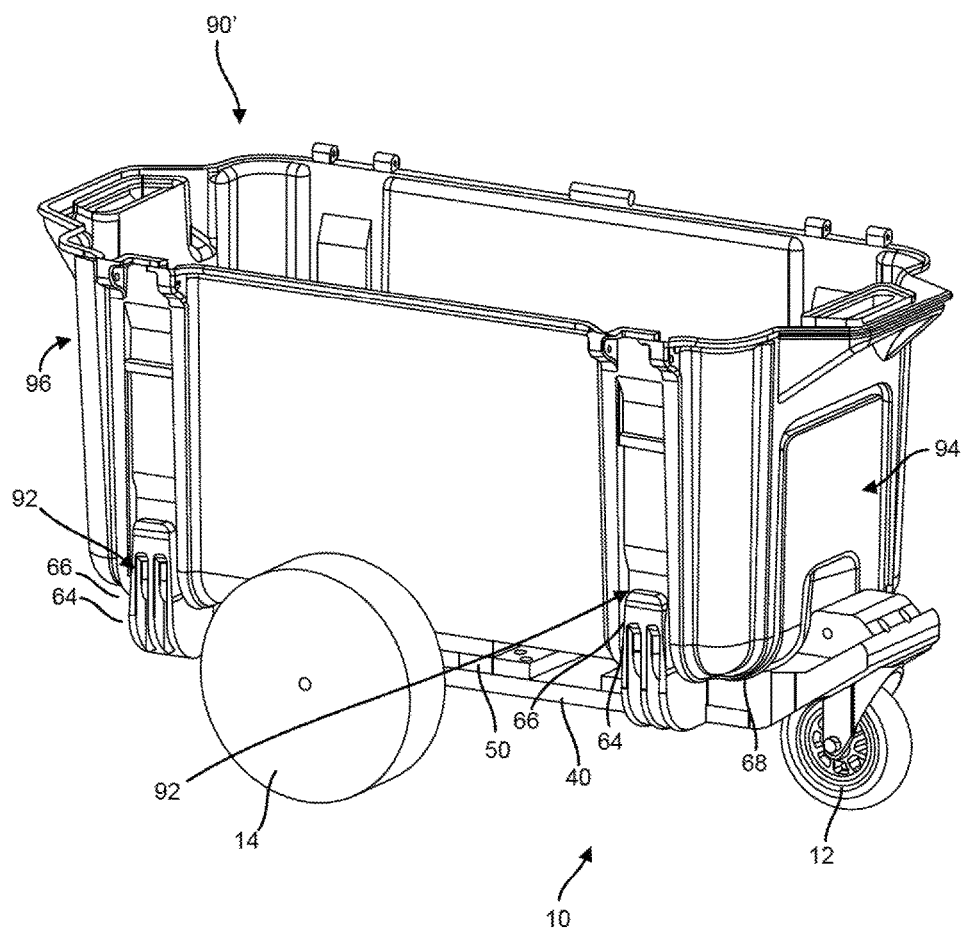
FIG. 25 is a perspective view of an exemplary cart in a second configuration with the handle removed and an attached cooler.
Figure 26:
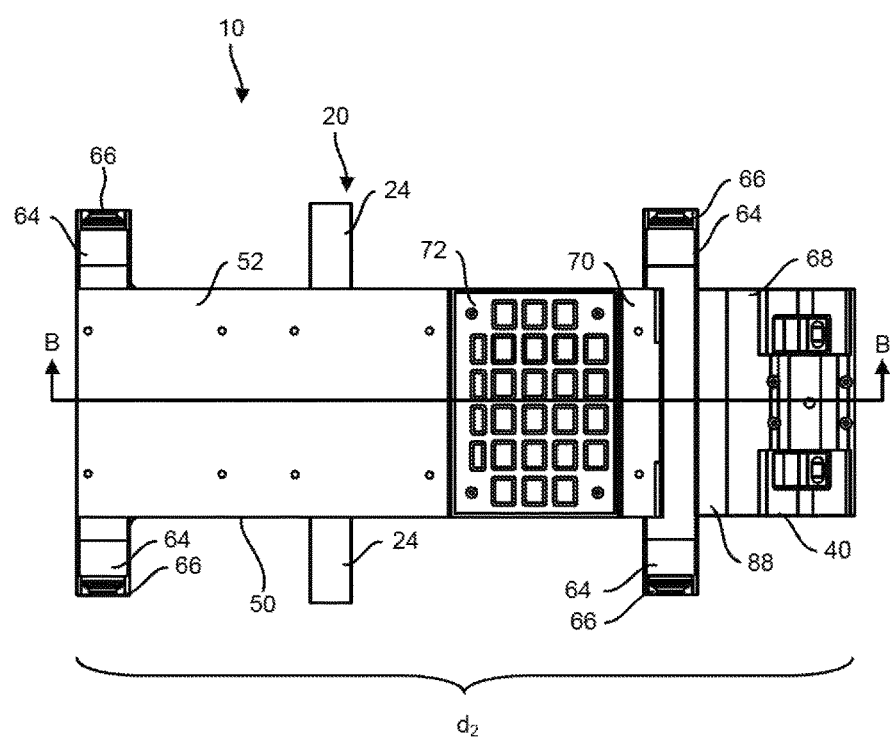
FIG. 26 is a top view of the cart of FIG. 24 in the second configuration without the attached cooler and the rear wheels and handle removed.
Figure 27:
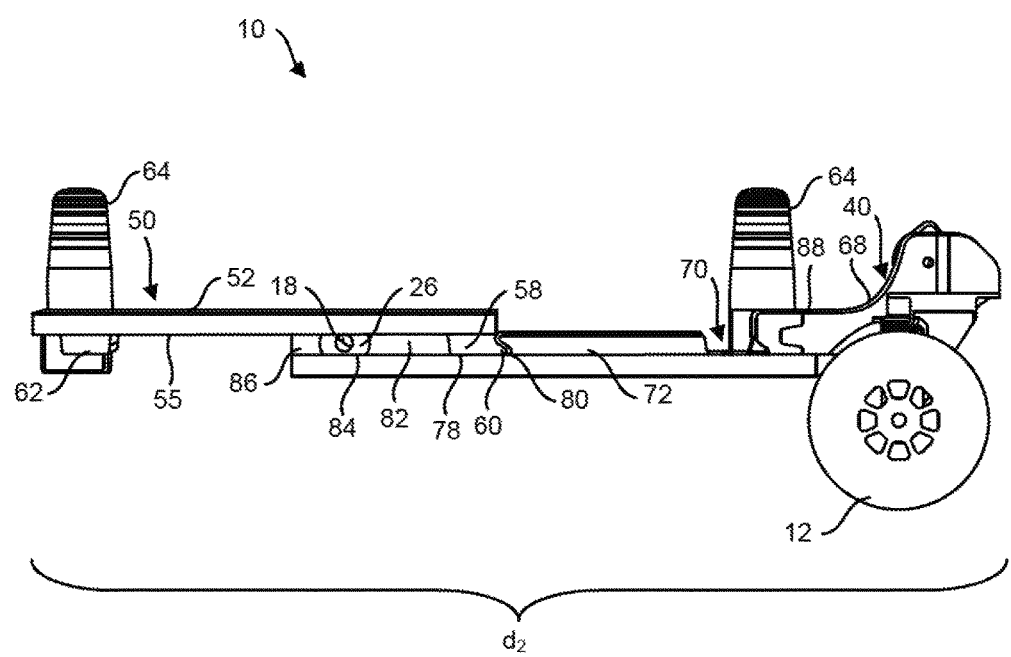
FIG. 27 is a cross-sectional view of the cart in FIG. 26 along the line B-B.

Referring next to FIG. 25, exemplary cart 10 (with the handle 30 not shown) is illustrated in a second configuration supporting a second cooler 90'. Cooler 90' has a length dimension defined between front wall 94 and rear wall 96 that is larger than the length dimension of cooler 90 defined between the front wall 94 and rear wall 96 as illustrated in FIG. 22. FIG. 26 illustrates a top view of the cart 10 in the second configuration without the cooler 90' and with the rear wheels 14 and handle 30 removed. FIG. 27 illustrates a sectional view of the cart 10 in the second configuration along the line B-B in FIG. 26.

Cooler 90' is illustratively supported by surface 52 of upper member 50 and surface 88 of lower member 40. In other embodiments, cooler 90' may be supported by only one of surface 52 and surface 88. Cooler 90' is restricted from moving in a lateral direction by a plurality of lateral supports 64 on cart 10. Cooler 90' includes one or more securement features 92 to releasably couple the cooler 90' to a corresponding clasp 66 of cart 10.

In the second configuration illustrated in FIGS. 25-27, the ridge 58 of upper member 50 is received in the second channel 78 of lower member 40, and the tongue 60 of upper member 50 is received within groove 80 of lower member 40. The axle support 20 is received within the third channel 84 of lower member 40 and below bottom surface 55 of upper member 50. The ridge 62 is not received within a channel of the lower member 40, but extends beyond the end stop 86 of lower member 40. The lower surface 55 of upper member 50 is illustratively in contact with and supported by the second raised portion 82, and the end stop 86 of lower member 40.

As illustrated in FIGS. 23 and 24, in the first configuration, cart 10 defines a first length $d_1$. As illustrated in FIGS. 26 and 27, in the second configuration, cart 10 defines a second length $d_2$ which is greater than $d_1$. Accordingly, the components of cart 10 can be moved between the first position illustrated in FIGS. 22-24 and the second position illustrated in FIGS. 25-27 to accommodate coolers or other containers of different lengths, such as coolers 90 and 90'. In some embodiments, the ability of cart 10 to transport cooler 90 in a first configuration and cooler 90' in a second configuration provides several advantages. For example, the cart 10 in the first configuration allows for a shorter distance between the front wheel 12 and rear wheels 14, and in some embodiments the center of gravity of the cooler 90 may be positioned between the rear wheels 14 and front wheel 12, resulting in a cart 10 that is easier for a user to pull and/or steer. In the second configuration, the cart 10 allows for a greater distance between the front wheel 12 and rear wheels 14. In some embodiments, this allows for a larger cooler 90' to be supported by cart 10 while maintaining the center of gravity of cooler 90' between the front wheels 12 and rear wheels 14, resulting in a cart 10 that is easier for a user to pull and/or steer.

Although FIGS. 22-27 illustrate a cart 10 including a ridge 58 received in a first channel 70 in a first configuration having a first length $d_1$ and a second channel in a second configuration having a second length $d_2$, in other embodiments, the cart 10 may include additional channels for receiving the ridge 58 to provide a third configuration having a third length $d_3$ where $d_3$ is different than either $d_1$ or $d_2$, where the third configuration supports a cooler or other container of a different length than cooler 90 or cooler 90'.

Figure 28:
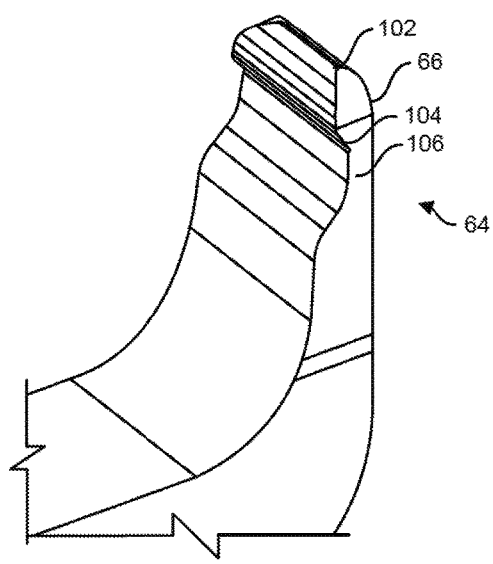
FIG. 28 illustrates a front perspective view of an exemplary lateral support.
Figure 29:
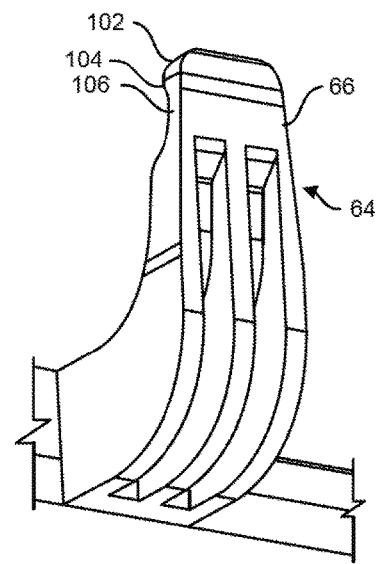
FIG. 29 illustrates a rear perspective view of the exemplary lateral support of FIG. 28.
Figures 31, 32:
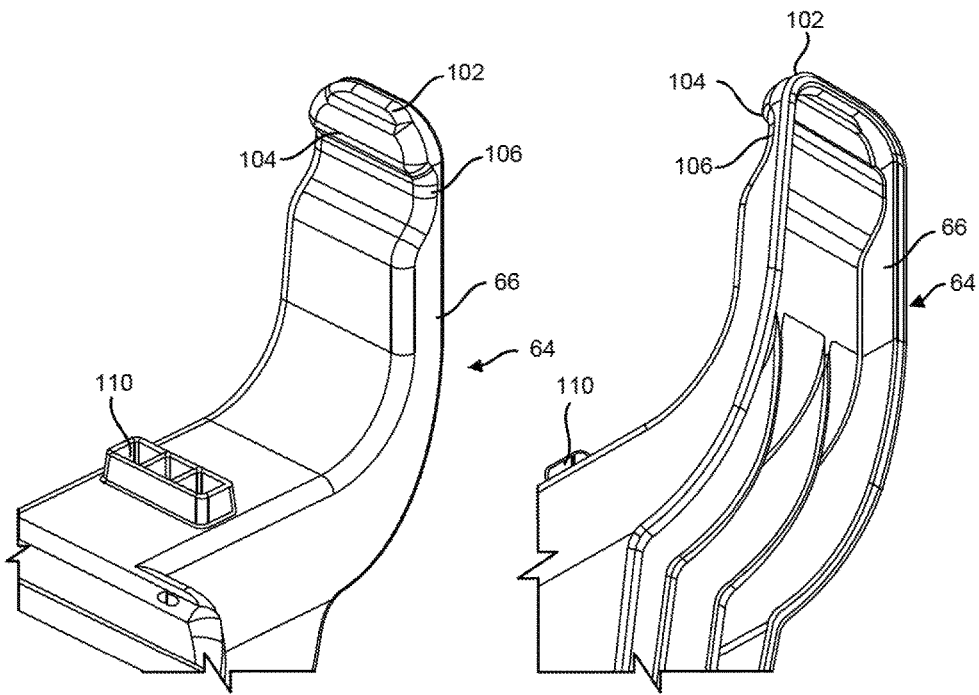
FIG. 31 illustrates a front perspective view of another exemplary lateral support.
FIG. 32 illustrates a rear perspective view of the exemplary lateral support of FIG. 31.
Figure 34:
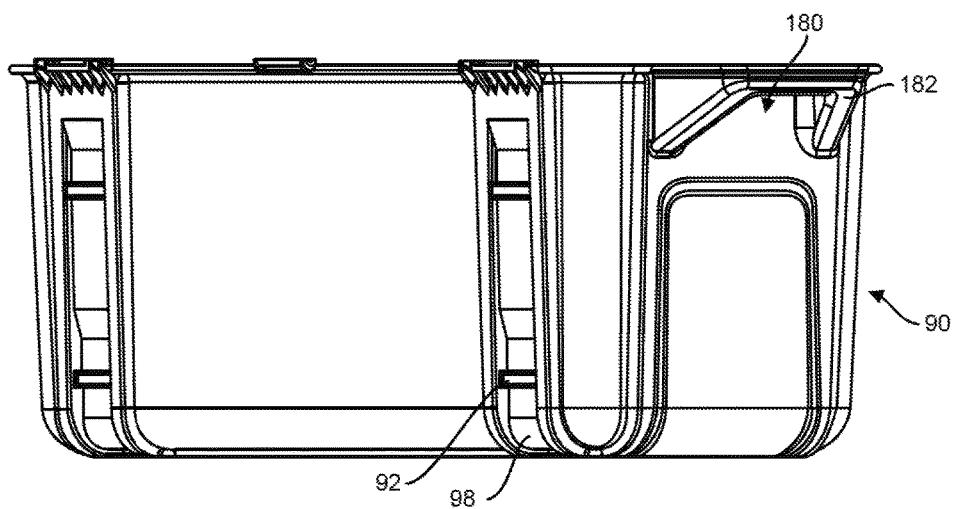
FIG. 34 illustrates a perspective view of an exemplary cooler for use with the latching system of FIG. 33.

Referring next to FIGS. 28 and 29, an exemplary lateral support 64 is illustrated. Another exemplary lateral support 64 is illustrated in FIGS. 31 and 32. Each lateral support 64 includes a clasp 66 configured to releasably couple to a corresponding securement feature 92 of a cooler 90 or other container to secure the cooler or other container (see FIG. 34). Clasp 66 is illustratively formed from a resilient material, allowing clasp 66 to flex outwardly when a force is applied, and then return to its original shape once the force is removed. In some exemplary embodiments, clasp 66 includes a tapered leading edge 102 leading to retaining latch 104 and reduced thickness area 106.

Figure 30:
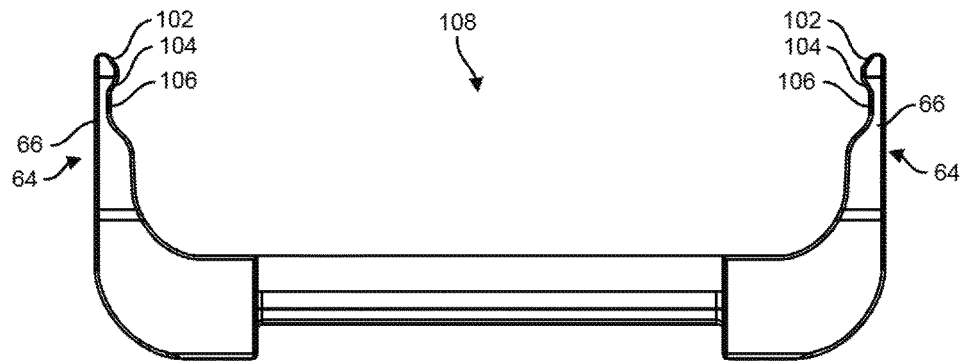
FIG. 30 illustrates an exemplary latching system including the exemplary lateral support of FIG. 28.
Figure 33:
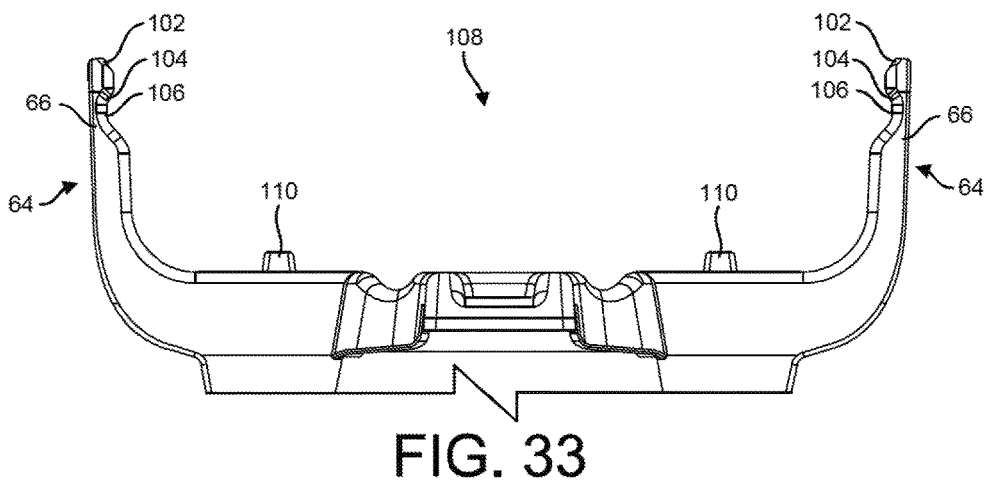
FIG. 33 illustrates an exemplary latching system including the exemplary lateral support of FIG. 31.

Referring next to FIGS. 30 and 33 two exemplary container securing members 108 are illustrated. An exemplary cart, such as cart 10 in FIG. 1 or cart 112 in FIG. 36, may include one or more container securing members 108 for securing a cooler 90 or other container to the cart. Each container securing member 108 includes two opposing lateral supports 64.

Figure 35:
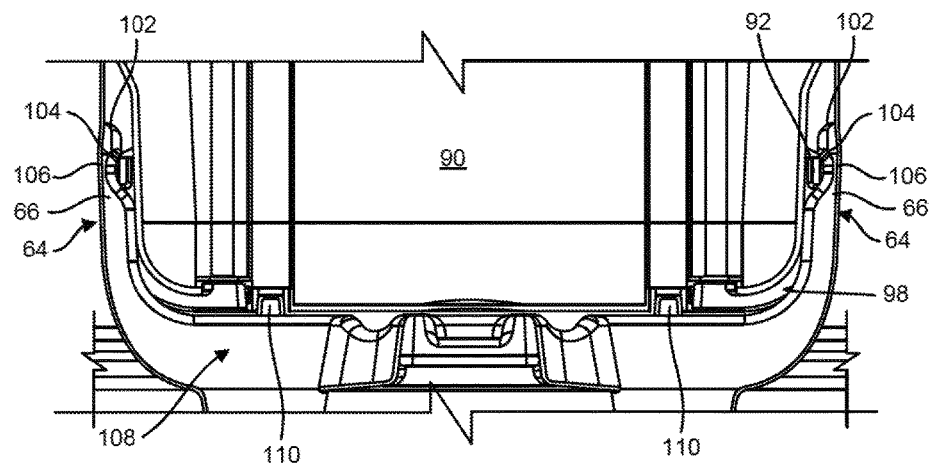
FIG. 35 illustrates a front view of the cooler of FIG. 34 secured in the latching system of FIG. 33.

Referring to the front view of the exemplary embodiment illustrated in FIG. 35, when the cooler 90 is placed into container securing member 108, on each clasp 66 a lower portion 98 of cooler 90 contacts tapered edge 102. The resilient nature of clasp 66 allows it to flex outwardly away from cooler 90 due to the force applied by the lower portion 98, allowing cooler 90 to be lowered on to container securing member 108. Once the securement feature 92 has aligned with the reduced thickness area 106, the clasp 66 returns towards its original shape, and the securing feature 92 is seated in the recess or space adjacent the reduced thickness area 106. In some embodiments, the weight of the cooler 90 will be supported in the position by a surface, such as surface 52 or surface 88 of the cart (see FIG. 24), or by a support projection 110 extending upward from a surface of the cart (see FIG. 31). Once securing feature 92 is seated in the recess or space adjacent the reduced thickness area 106, retaining latch 104 contacts securing feature 92, securing cooler 90 to the cart. Upon application of a large enough upward force, securing feature 92 will apply an outward force on retaining latch 104, flexing clasp 66 away from cooler 90 can be removed from container securing member 108.

Figure 36:
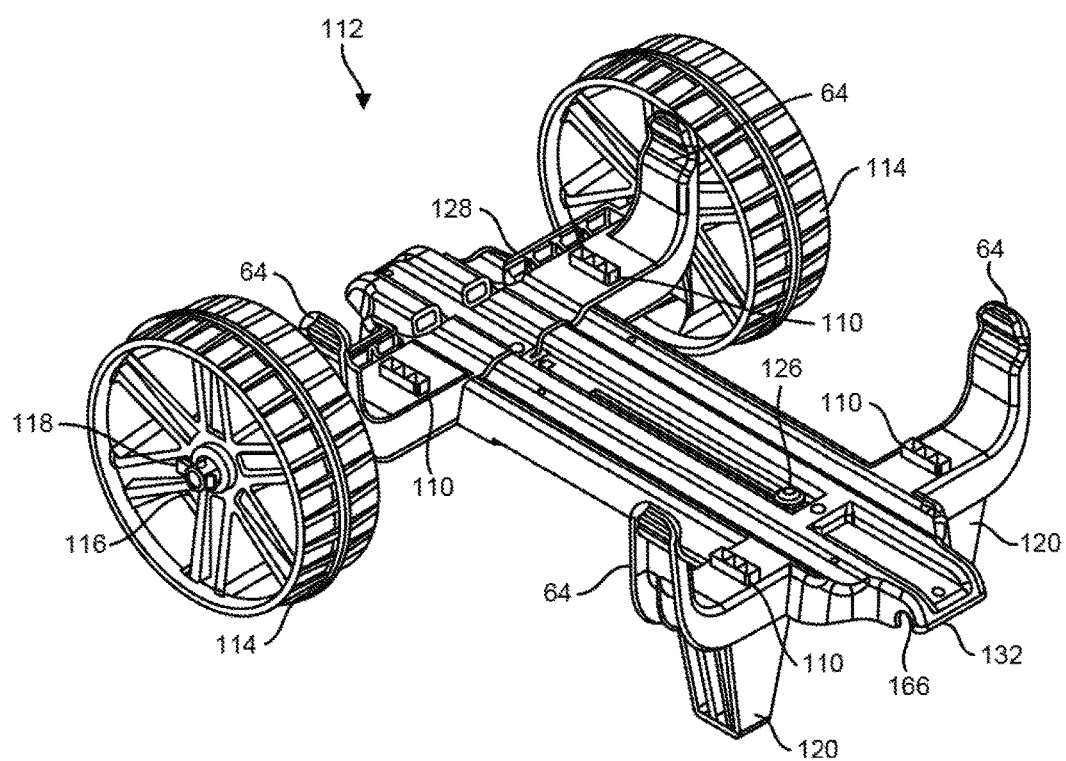
FIG. 36 illustrates a perspective view of an exemplary cart in a first configuration for transporting an object such as a storage container or a cooler.
Figure 37:
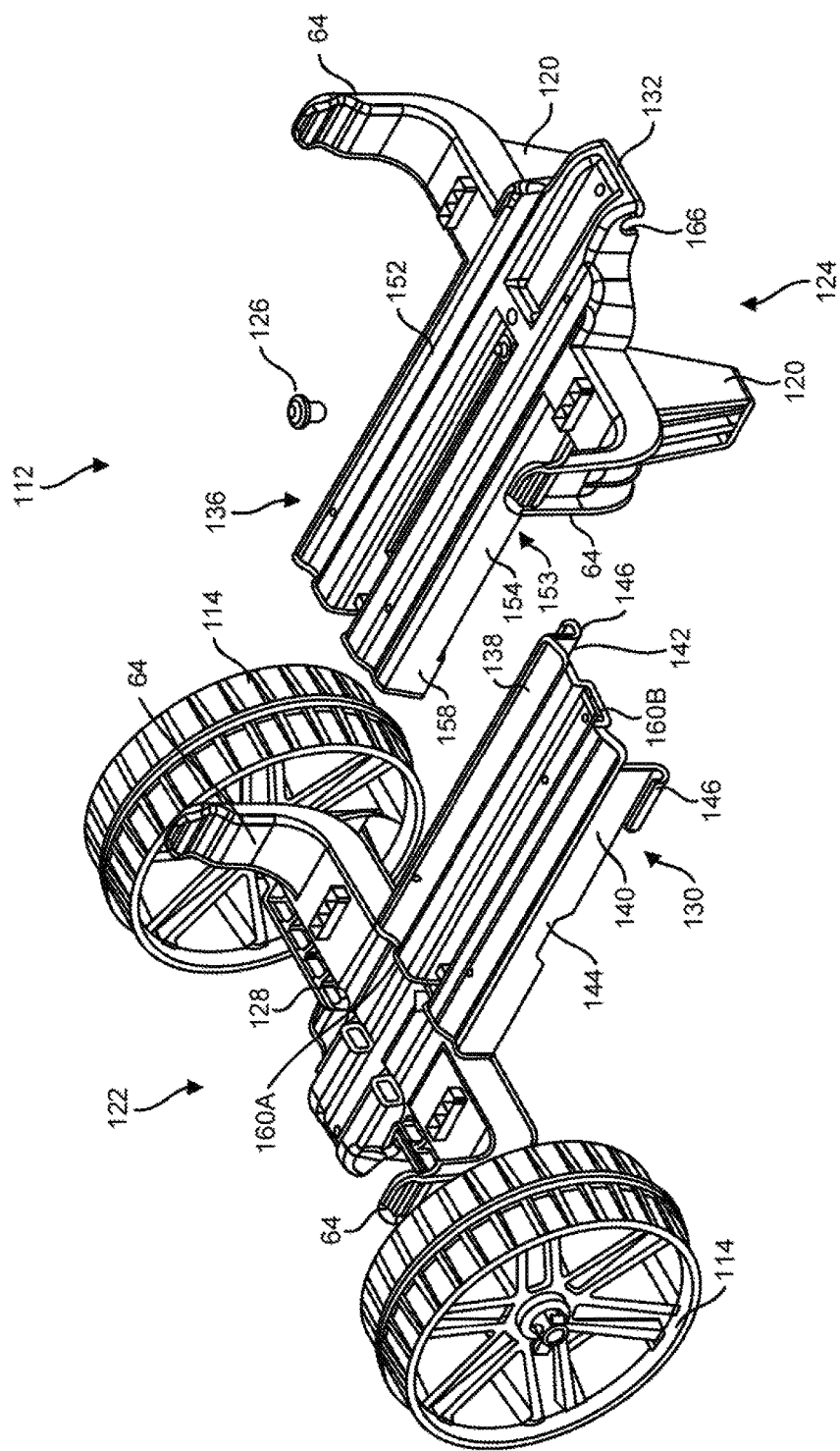
FIG. 37 illustrates an exploded view of the cart of FIG. 36.
Figure 38:
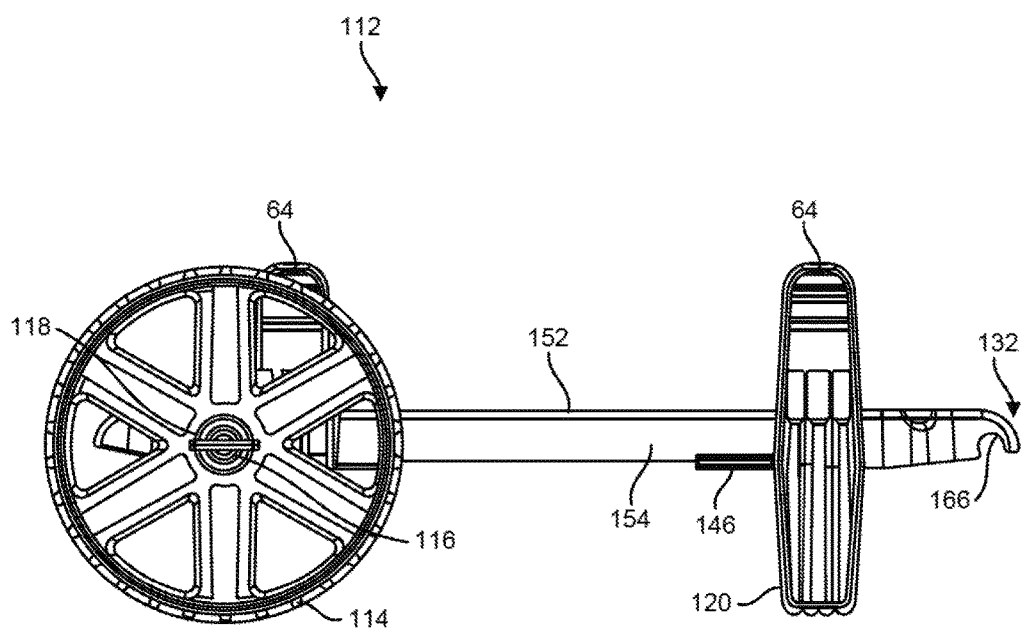
FIG. 38 illustrates a side view of the cart of FIG. 36.
Figure 39:
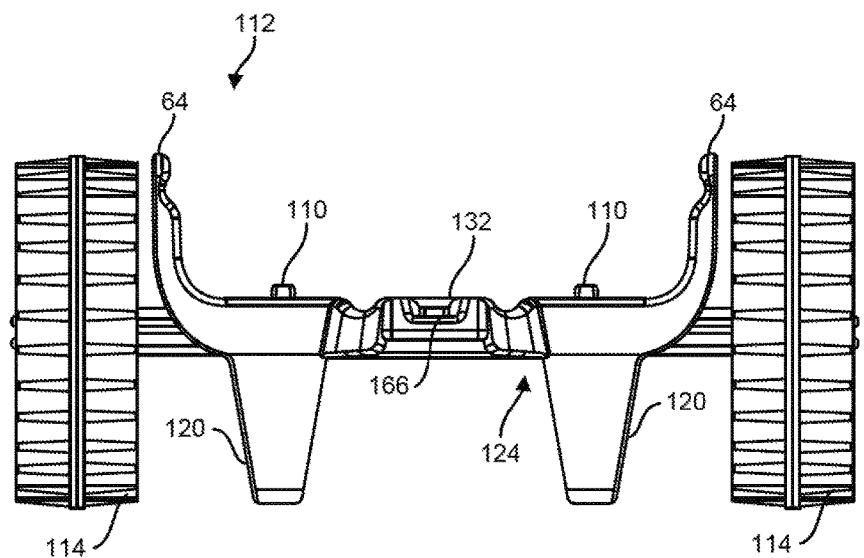
FIG. 39 illustrates a front view of the cart of FIG. 36.
Figure 40:
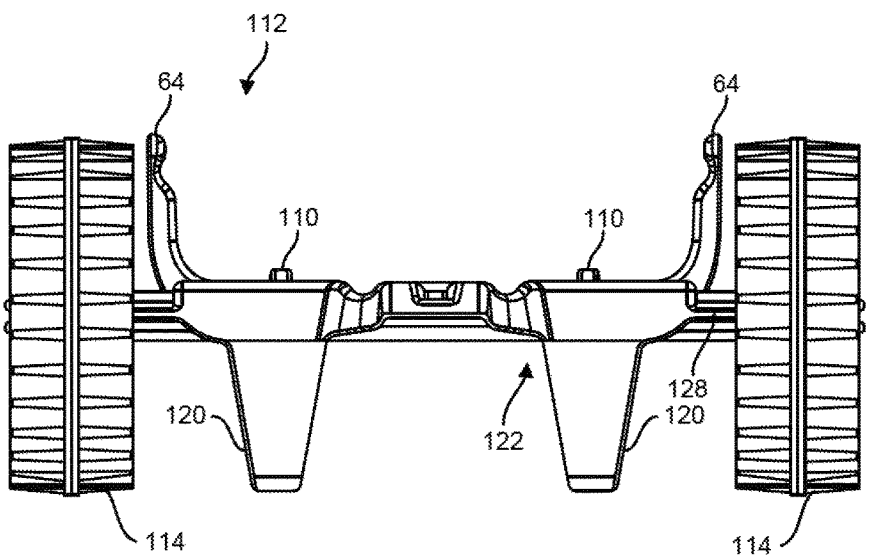
FIG. 40 illustrates a rear view of the cart of FIG. 36.
Figure 41:
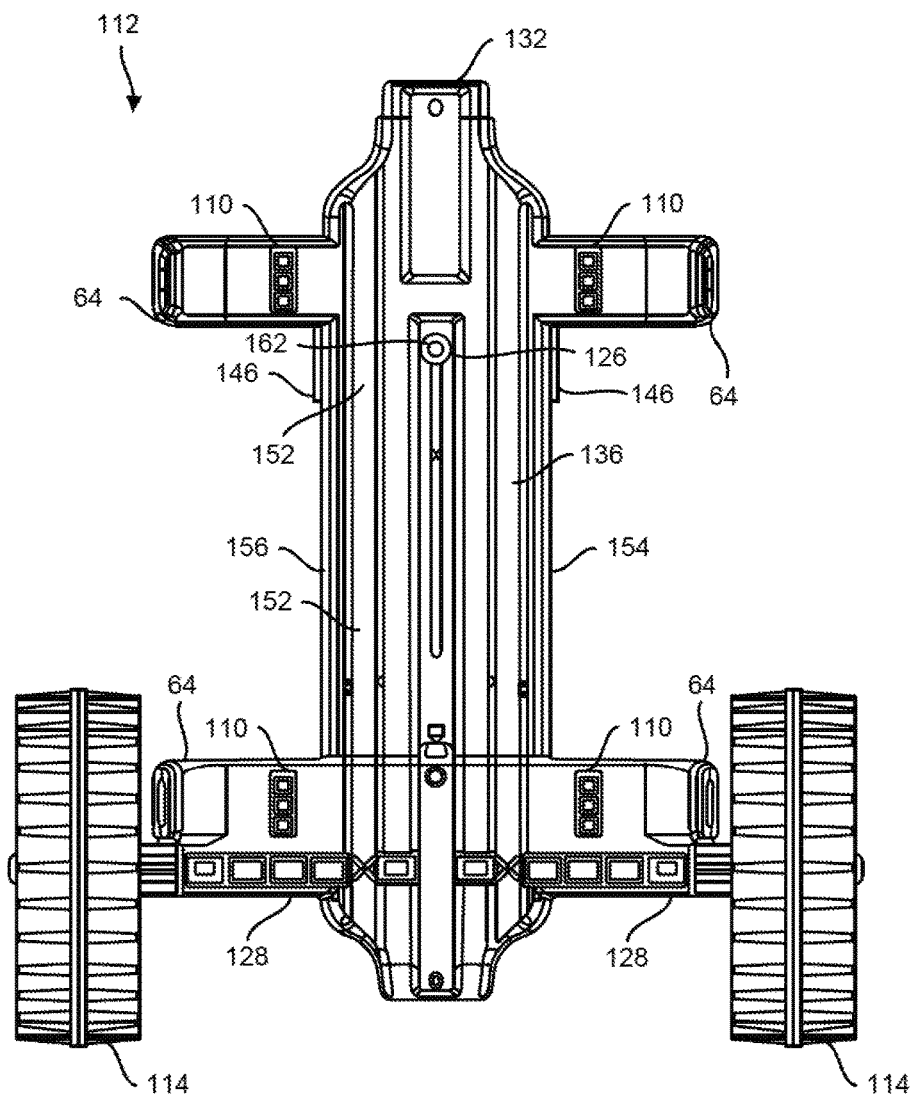
FIG. 41 illustrates a top view of the cart of FIG. 36.
Figure 42:
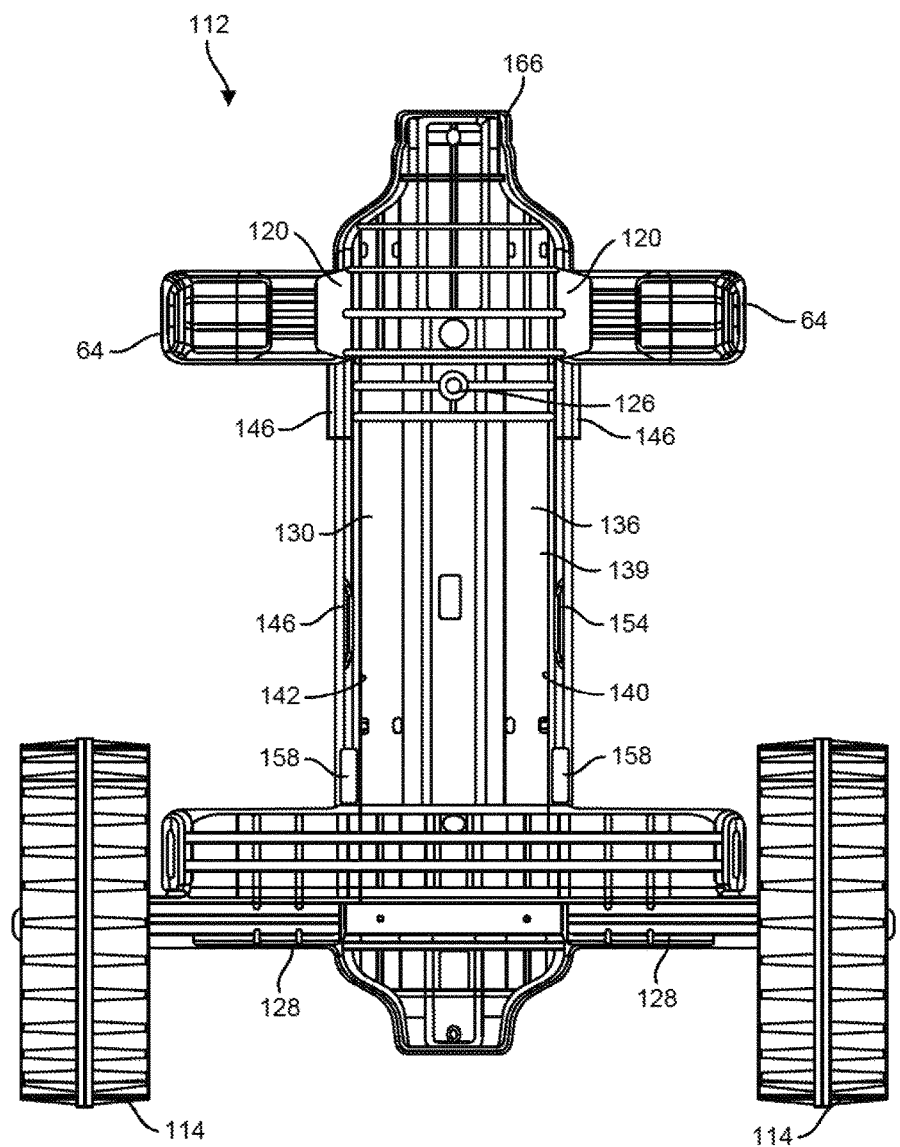
FIG. 42 illustrates a bottom view of the cart of FIG. 36.

Referring next to FIGS. 36-42, an exemplary cart 112 is illustrated. FIG. 36 illustrates a perspective view of cart 112. FIG. 37 illustrates an exploded view of cart 112. FIG. 38 illustrates a side view of cart 112. FIG. 39 illustrates a front view of cart 112. FIG. 40 illustrates a rear view of cart 112. FIG. 41 illustrates a top view of cart 112. FIG. 42 illustrates a bottom view of cart 112.

As illustrated in FIGS. 36-42, cart 112 includes two pairs of lateral supports 64, each pair forming a container securing member 108 to receive a storage container such as cooler 90. Each lateral support 64 includes a clasp 66 for securing the cooler 90 to cart 112. Cart 112 includes two support projections 110 between each pair of lateral supports 64 for supporting the weight of cooler 90.

Cart 112 further includes first and second rear wheels 114 connected by an axle 116. In some embodiments, rear wheels 114 rotate around a fixed axle 116. In other embodiments, rear wheels 14 are rotatably fixed to axle 116, and axle 116 rotates to allow cart 112 to move. In some exemplary embodiments, rear wheels 114 may be removably attached to axle 116 by a securing pin or clasp 118.

Cart 112 includes one or more front ground engaging members 120. In some exemplary embodiments, such as illustrated in FIGS. 36-42, the ground engaging members 120 may be one or more legs 120 configured to extend from the cart 112 to the ground and support the weight of a front portion of cart 112. In other exemplary embodiments, front ground engaging member 120 may be one or more wheels, such as a pair of wheels or a caster wheel.

In the exemplary embodiment illustrated in FIG. 37, cart 112 includes a rear portion 122 and a front portion 124. A fastener 126 illustratively secures the rear portion 122 and front portion 124 relative to each other as described in more detail below.

In some embodiments, rear portion 122 is formed from a suitably strong plastic or glass-filled plastic material, such as polypropylene. Rear portion 122 includes a first pair of lateral supports 64 and support projections 110 for supporting the cooler 90 and attaching it to cart 112. As illustrated in FIGS. 36-42, rear portion 122 includes axle overmold 128. In some embodiments, axle overmold 128 is formed by overmolding rear portion 122 around axle 116 in an injection molding process to secure axle 116 to rear portion 122. As shown in FIG. 37, rear portion 122 further includes a rear connecting portion 130 for connecting rear portion 122 with front portion 124.

In some embodiments, front portion 124 is formed from a suitably strong plastic or glass-filled plastic material, such as polypropylene. Front portion 124 includes a first pair of lateral supports 64 and support projections 110 for supporting the cooler 90 and attaching it to cart 112, and a pair of legs 120 extending from a bottom of front portion 124 to support the weight of a front portion of the cart 112 and cooler 90. Front portion 124 includes handle attachment 132 for attaching a handle 134 (FIG. 50) to cart 112. As shown in FIG. 37, front portion 124 further includes a front connecting portion 136 for connecting rear portion 122 with front portion 124.

Referring to rear portion 122 as illustrated in FIGS. 37, 42, 43, and 44, rear connecting portion 130 includes a top surface 138, a bottom surface 139, and opposing edge surfaces 140 and 142 extending from top surface 138. Each edge surface 140, 142 includes an assembly gap 144 to assist in assembling rear portion 122 and front portion 124 and a supporting groove 146 for receiving and supporting a corresponding edge surface 154, 156 of front connecting portion 136. Top surface 138 includes a plurality of grooves 148 (FIG. 44) for mating with corresponding grooves 150 (FIG. 46) on front connecting portion 136. Although three grooves 148A, 148B, and 148C are illustrated for mating with three corresponding grooves 150A, 150B, and 150C of front connecting portion 136, in other embodiments, rear portion 122 and front portion 124 may include more than or less than three grooves. In some exemplary embodiments, top surface 138 is configured to support a cooler 90 positioned on cart 112. In other embodiments, top surface 138 is not configured to support the weight of a cooler 90 positioned on cart 112.

Figure 45:
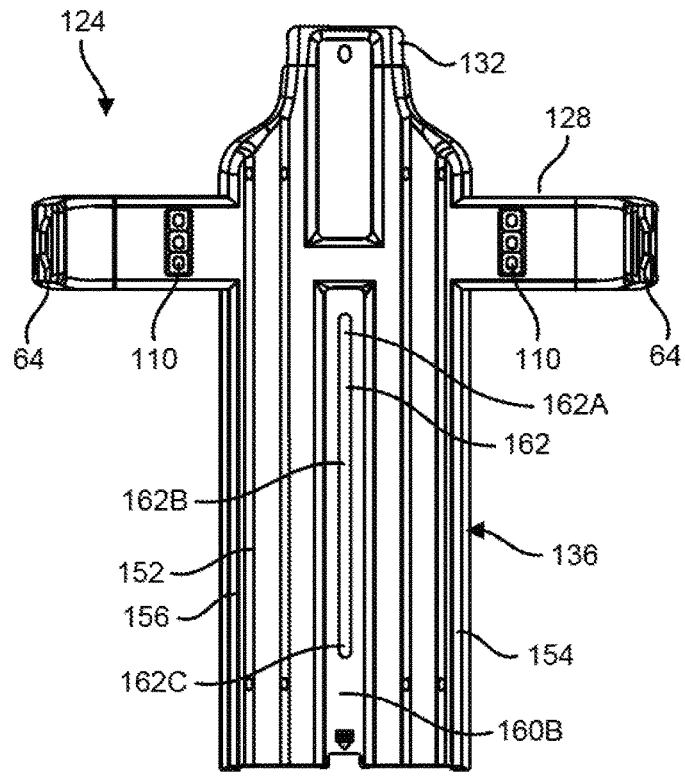
FIG. 45 illustrates a top view of a second portion of the cart of FIG. 36.
Figure 46:
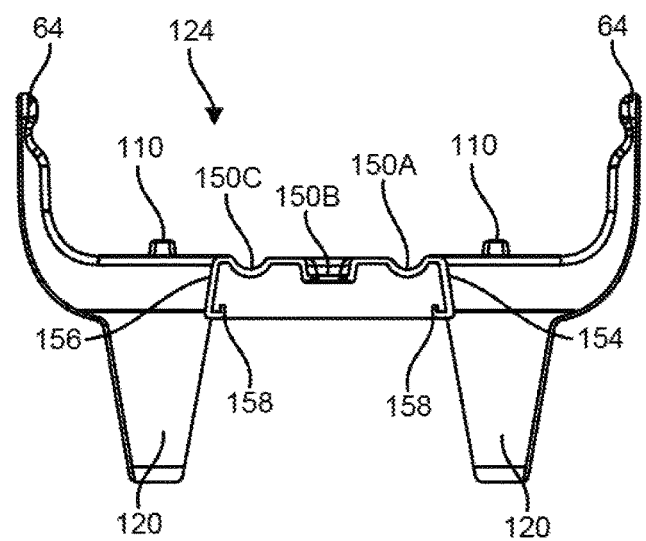
FIG. 46 illustrates a rear view of the second portion of FIG. 45.

As illustrated in FIGS. 37, 45, and 46, front connecting portion 136 includes a top surface 152, a bottom surface 153, and opposing edge surfaces 154 and 156 extending from top surface 152. Each edge surface 154, 156 includes a supporting groove 158 for receiving and supporting a corresponding edge surface 140, 142 of rear connecting portion 130. Top surface 152 includes a plurality of grooves 150 for mating with corresponding grooves 148 on rear connecting portion 130. In some exemplary embodiments, top surface 152 is configured to support a cooler 90 positioned on cart 112. In other embodiments, top surface 152 is not configured to support the weight of a cooler 90 positioned on cart 112.

In one exemplary embodiment, rear portion 122 and a front portion 124 are assembled by placing edge surfaces 154, 156 of front connecting portion 136 into the corresponding supporting grooves 146 positioned on edge surfaces 140, 142 of rear connecting portion 130. Supporting grooves 158 on edge surfaces 154, 156 of front connecting portion 136 are aligned with the corresponding assembly gaps 144 on corresponding edge surfaces 140, 142 of rear connecting portion 130. Grooves 150A, 150B, 150C of top surface 152 of front connecting portion 136 are aligned with corresponding grooves 148A, 148B, 148C of top surface 138 of rear connecting portion 130. Front portion 124 is then moved relative to rear portion 122 in a direction away from rear wheels 114 such that each supporting groove 158 of edge surfaces 154, 156 of front connecting portion 136 engages and supports a corresponding edge surface 140, 142 of rear connecting portion 130. The position of rear portion 122 relative to front portion 124 is then fixed using fastener 126. Although in illustrated embodiment of cart 112 the top surface 152 of front portion 124 is overlaid on top of top surface 138 of rear portion 122 and assembly gaps 144 are present on rear portion 122, in other embodiments, the top surface 138 of rear portion 122 is overlaid on top of top surface 152 of front portion 124 and assembly gaps 144 are present on front portion 124.

Figure 43:
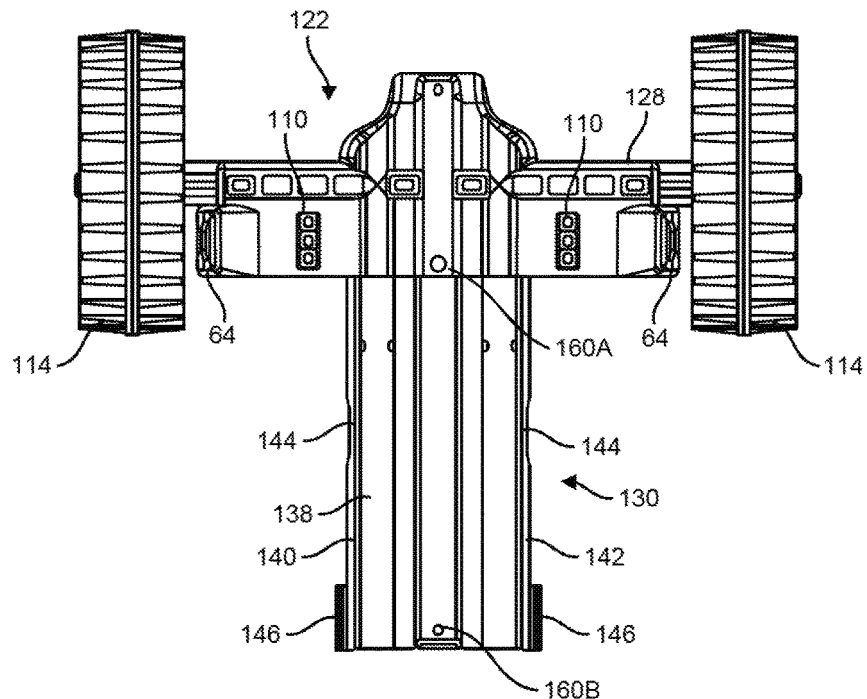
FIG. 43 illustrates a top view of a first portion of the cart of FIG. 36.
Figure 44:
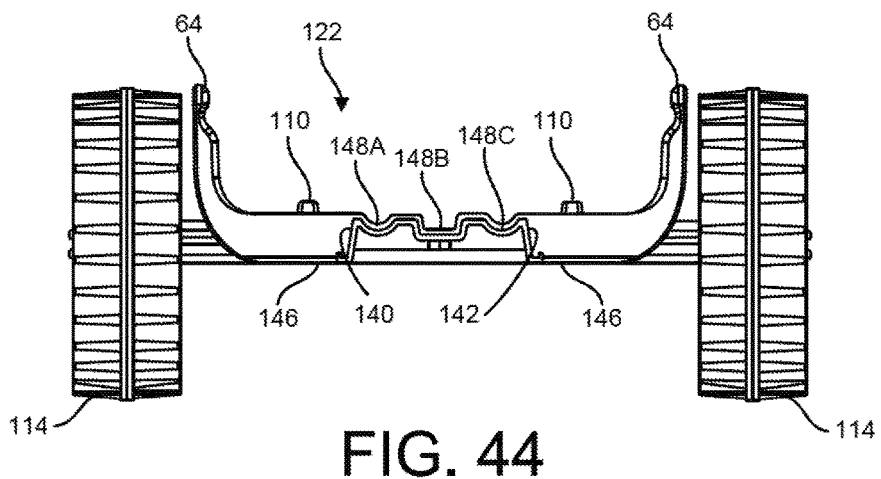
FIG. 44 illustrates a front view of the first portion of FIG. 43.

In one exemplary embodiment, a length of cart 112 can be adjusted to fit coolers 90 of various sizes using fastener 126. As illustrated in FIG. 43, rear portion 122 illustratively includes a first aperture 160A and a second aperture 160B. Although two apertures 160A and 160B on rear portion 122 and a slot aperture 162 on front portion 124 are illustrated, in other embodiments, rear portion 122 and front portion 124 may each include only a single aperture, two apertures, or three or more apertures to provide one or more fixed lengths for cart 112. In addition, although apertures 160A and 160B on rear portion 122 and slot aperture 162 are illustrated as discrete apertures and slot aperture 162 on front portion is illustrated as a continuous opening allowing multiple attachment points along its length, in other embodiments, rear portion 122 and front portion 124 may each independently have discrete apertures similar to apertures 160A, 160B, a continuous opening similar to slot aperture 162, or both. Moreover, although fastener 126 is illustrated as a nut and bolt, in other embodiments, fastener 126 may be selected from a pin, a snap, a rivet, a friction fitting, a screw, an adhesive, a hook-and-loop fastener, a hook-and-eye fastener, a buckle, a clip, or other suitable fastener.

Figure 47:
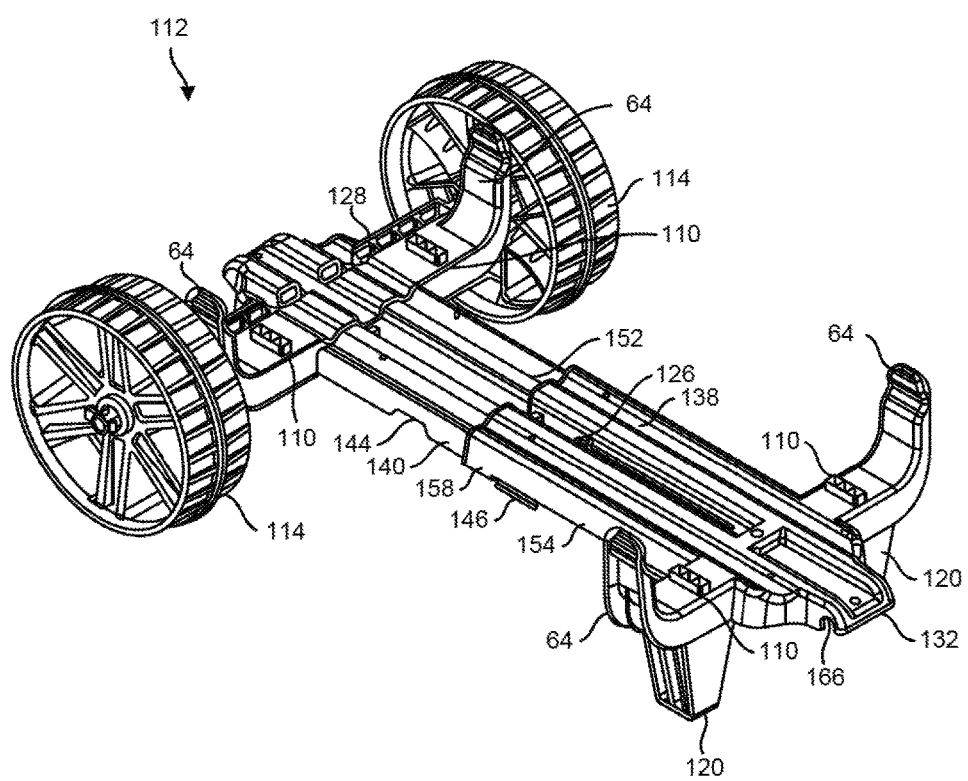
FIG. 47 illustrates a perspective view of the cart of FIG. 36 in a second configuration.

In the illustrated embodiment, fastener 126 may be inserted through aperture 160A and slot aperture 162 at a first slot position 162A and secured to provide a first length of cart 112, such as illustrated in FIG. 36. Alternatively, the length of cart 112 can be lengthened by sliding rear portion 122 relative to front portion 124 and fastener 126 may be inserted through aperture 160B and slot aperture 162 at first slot position 162A and secured to provide a second length of cart 112, such as illustrated in FIG. 47, where the second length illustrated in FIG. 47 is longer than the first length as illustrated in FIG. 36. Other lengths may be provided by securing the fastener 126 through either aperture 160A or 160B at other positions in slot aperture 162, such as slot positions 162B and 162C.

Figure 48:
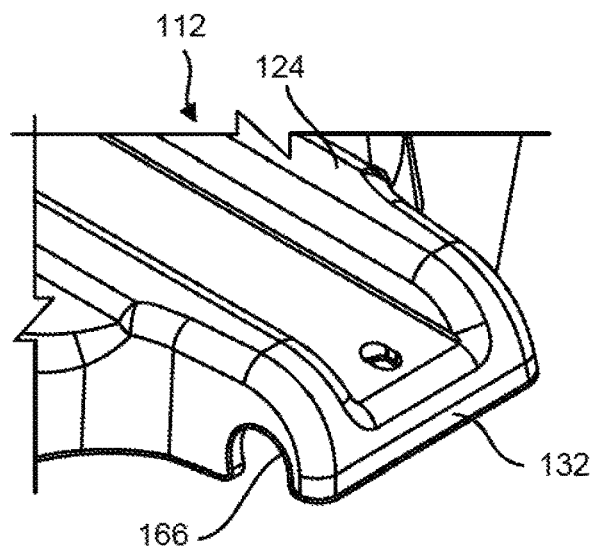
FIG. 48 illustrates a top perspective view of a handle attachment of the cart of FIG. 36.
Figure 49:
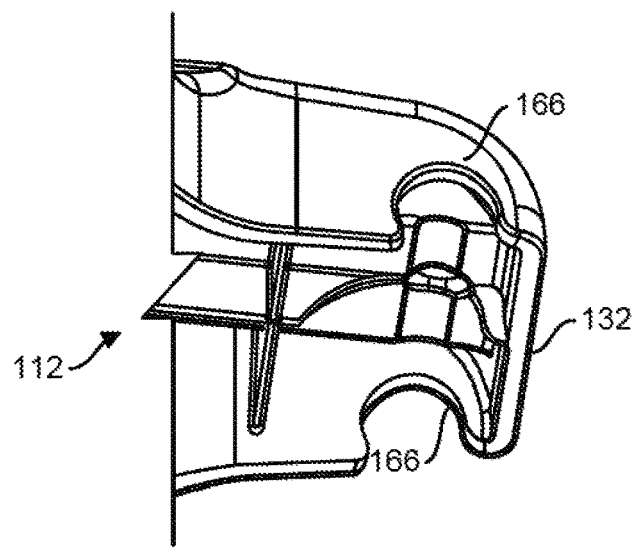
FIG. 49 illustrates a bottom perspective view of the handle attachment of FIG. 48.

Referring next to FIGS. 48 and 49, cart 112 includes a handle attachment 132. As illustrated, handle attachment 132 may form a portion of front portion 124. In one exemplary embodiment, handle attachment 132 is formed of a suitable flexible, resilient material, such as plastic or glass-filled plastic material, and includes one or more snap-receivers 166 for releasably attaching handle attachment 132 to a handle 134 (FIG. 50).

Figure 50:
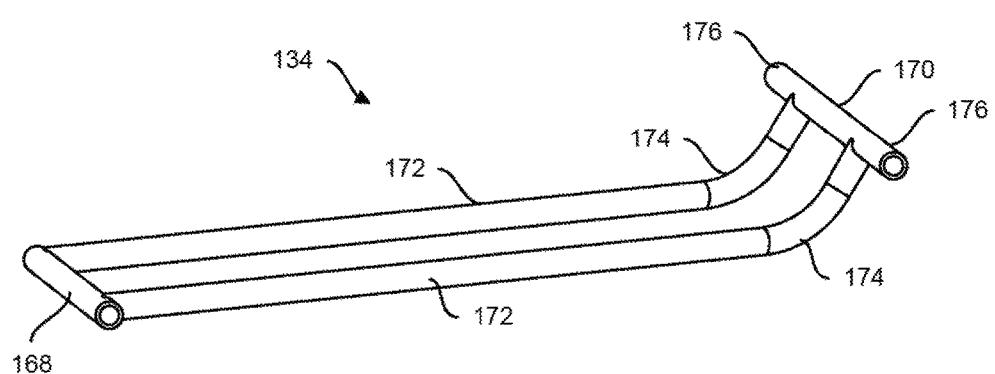
FIG. 50 illustrates an exemplary handle for user with the cart of FIG. 36.

An exemplary handle 134 is illustrated in FIG. 50. In one exemplary embodiment, handle 134 includes a first end 168 and a second end 170 joined by one or more length members 172. Each length member 172 includes a curved portion 174 attached to the second end 170. Second end 170 further includes extensions 176 extending outwardly from where each length member 172 attached to the second end 170.

In some embodiments, handle 134 provides multiple attachment configurations with cart 112.

Figure 51:
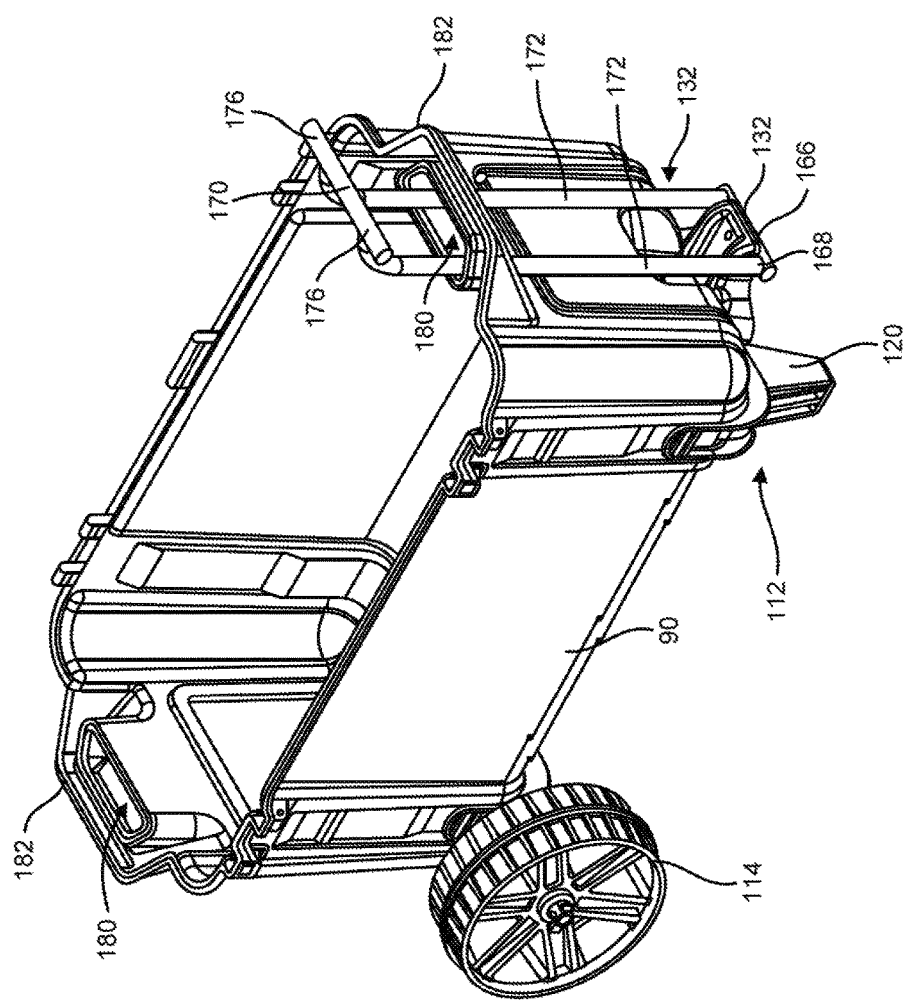
FIG. 51 illustrates a first configuration of the handle of FIG. 50 to pull the cart of FIG. 36.

In a first configuration, illustrated in FIG. 51, first end 168 of handle 134 includes a curved perimeter that is releasably attached to handle attachment 132 of cart 112. The curved perimeter of first end 168 is inserted into the snap-receivers 166, which flex open to receive the curved perimeter and secure the first end 168 to handle attachment 132. Upon application of a sufficient downward force, the snap-receivers again flex open enough to release the first end 168 of handle 134. As illustrated in FIG. 51, the length members 172 may be inserted through an aperture 180 in handle 182 of cooler 90. A user may then grasp second end 170 and lift up, raising the cart 112 off of legs 120, and allowing cart 112 and cooler 90 to be moved. In some embodiments, attaching the handle 134 as illustrated in FIG. 51 allows for relatively easy rotation of the cooler about rear wheels 114.

Figure 52:
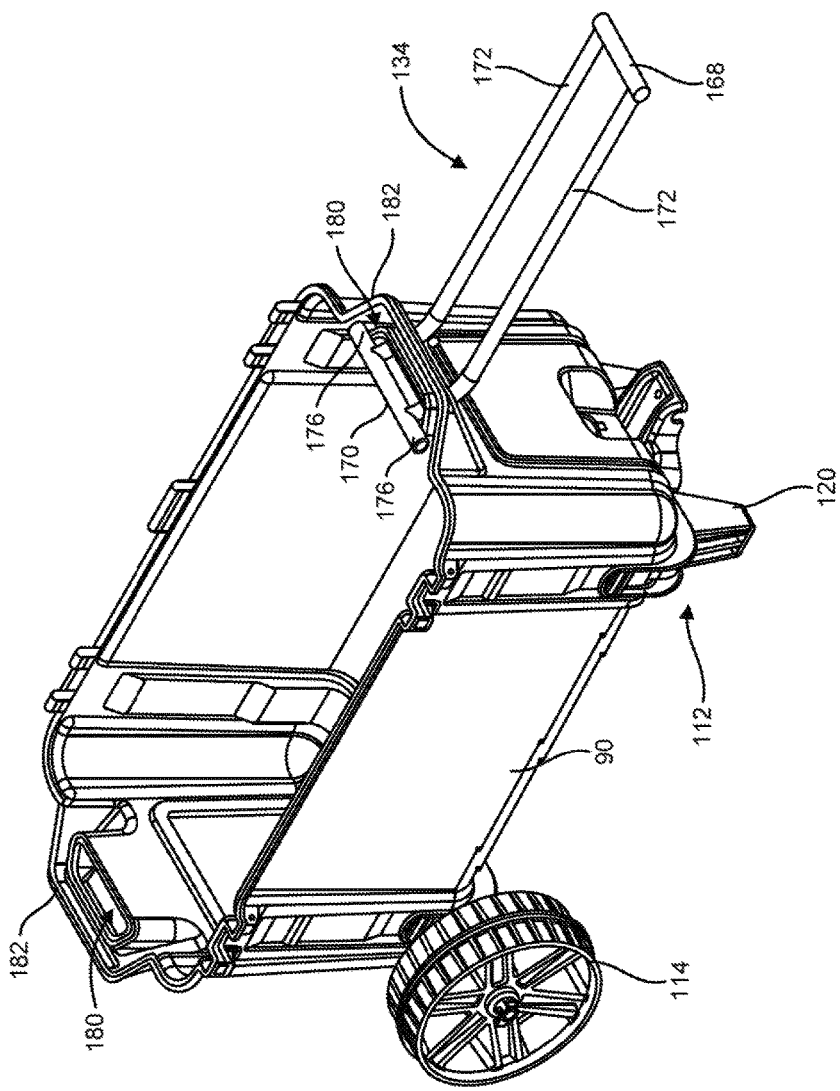
FIG. 52 illustrates a second configuration of the handle of FIG. 50 to pull the cart of FIG. 36.

In a second configuration, illustrated in FIG. 52, first end 168 of handle 134 is inserted downwardly through aperture 180 in handle 182 of cooler 90 such that extensions 176 of second end 170 contact the cooler and prevent it from passing through aperture 180. A user may then grasp first end 168 of handle 134 and lift up, raising the cart 112 off of legs 120, and allowing cart 112 and cooler 90 to be moved. In some embodiments, attaching the handle 134 as illustrated in FIG. 52 provides a longer lever arm from rear wheels 114 and provides an easier way to lift and pull the weight of cooler 90 on cart 112.

Figure 53:
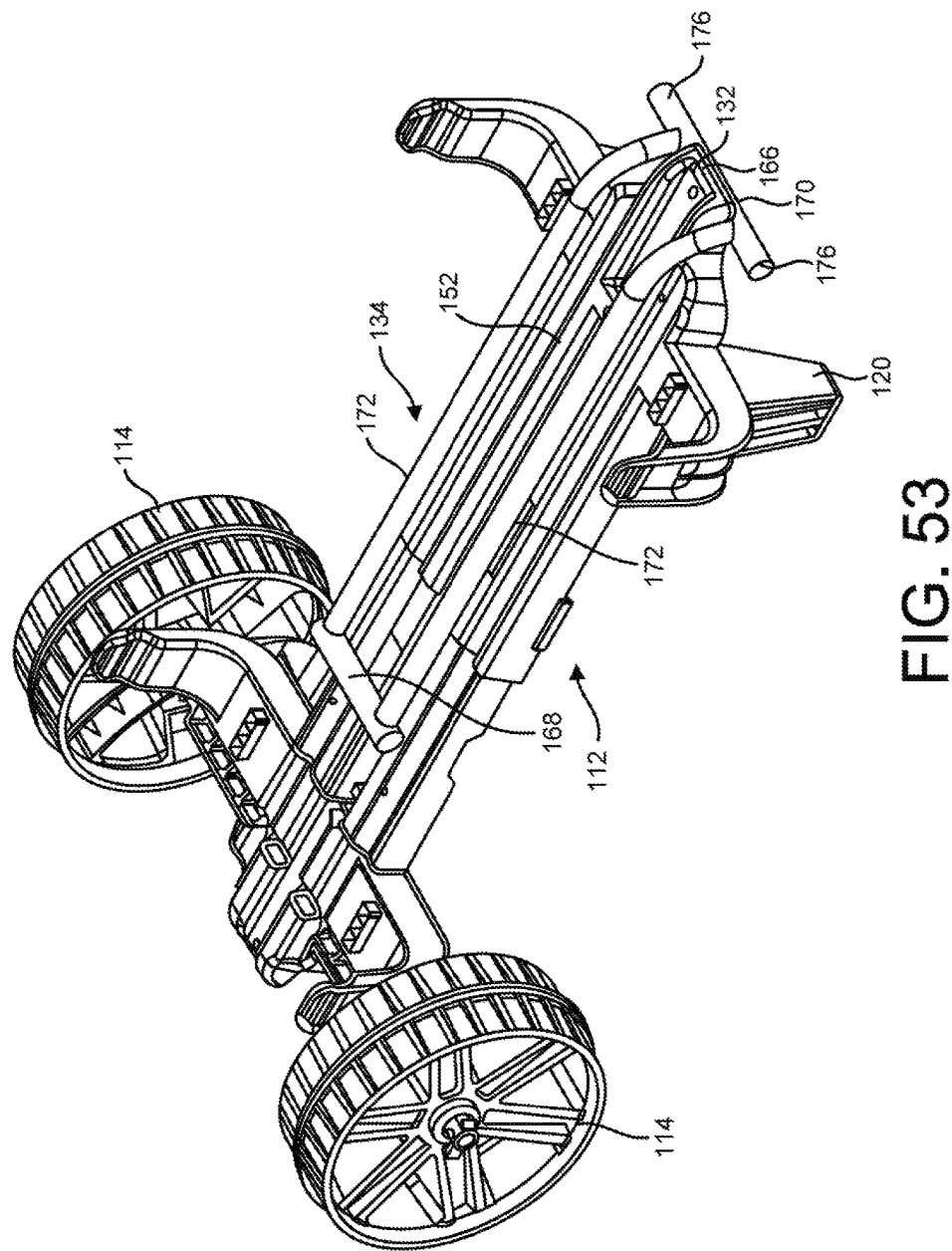
FIG. 53 illustrates a storage configuration of the handle of FIG. 50 and the cart of FIG. 36.

In a third configuration, illustrated in FIG. 53, a curved perimeter of second end 170 is inserted into the snap-receivers 166, which flex open to receive the curved perimeter and secure the first end 168 to handle attachment 132. Upon application of a sufficient downward force, the snap-receivers again flex open enough to release the second end 170 of handle 134. As illustrated in FIG. 53, the length members 172 and first end 168 may then be positioned against the top surface 152 of front portion 124. In some embodiments, attaching the handle 134 as illustrated in FIG. 53 allows for a convenient storage configuration for cart 112 when not in use.

Referring next to FIGS. 54-58, an exemplary cart 112 having a first portion 122 and a second portion 124 are joined by a fastener 184. As shown in FIG. 54, first portion 122 includes a rear connecting portion 130 having a first connecting aperture 186A and a second connecting aperture 186B formed therein. As shown in FIG. 55, second portion 124 includes a front connecting portion 136 having a first cutout or aperture 188 and a second cutout or aperture 190 spaced apart by a divider 192.

FIG. 56 illustrates an exemplary connector 184 for connecting the rear connecting portion 130 of first portion 122 and the front connecting portion 136 of second portion 124. Connector 184 includes a first ledge 194 and a second ledge 198 connected by bridging portion 196. The second ledge 198 is configured to be received within the second aperture 190 of the second portion 124 (see FIG. 55).

The bridge 196 is configured to extend above the divider 192 of second portion 124 such that the first ledge 194 extends below the first cutout 188 and is received into either the first connecting aperture 186A or the second connecting aperture 186B (see FIG. 55). The top surface of first ledge 194 is configured to abut bottom surface 139 of the rear connecting portion 130 of first portion 122, and the top surface of second ledge 198 is configured to abut bottom surface 153 of the front connecting portion 136 of second portion 124. In the exemplary embodiment illustrated in FIG. 56, the first ledge 194 is positioned lower than the second ledge 198. In other exemplary embodiments, the first ledge 194 and the second ledge 198 are positioned at the same height, or the first ledge 194 is positioned higher than the second ledge 198.

In an exemplary embodiment, the first portion 122 is connected to the second portion 124 by inserting the second ledge 198 into the aperture 190 and the first ledge 194 into cutout 188 of the second portion 124. The front connecting portion 136 is then angled downward relative to the rear connecting portion 130 of the first portion 122 and the first ledge 194 is inserted into either the first connecting aperture 186A or the second connecting aperture 186B. The front connecting portion 136 is then straightened relative to the rear connecting portion 130 until the top surface of the first ledge 194 abuts the bottom surface 139 of the rear connecting portion 130.

Figure 57:
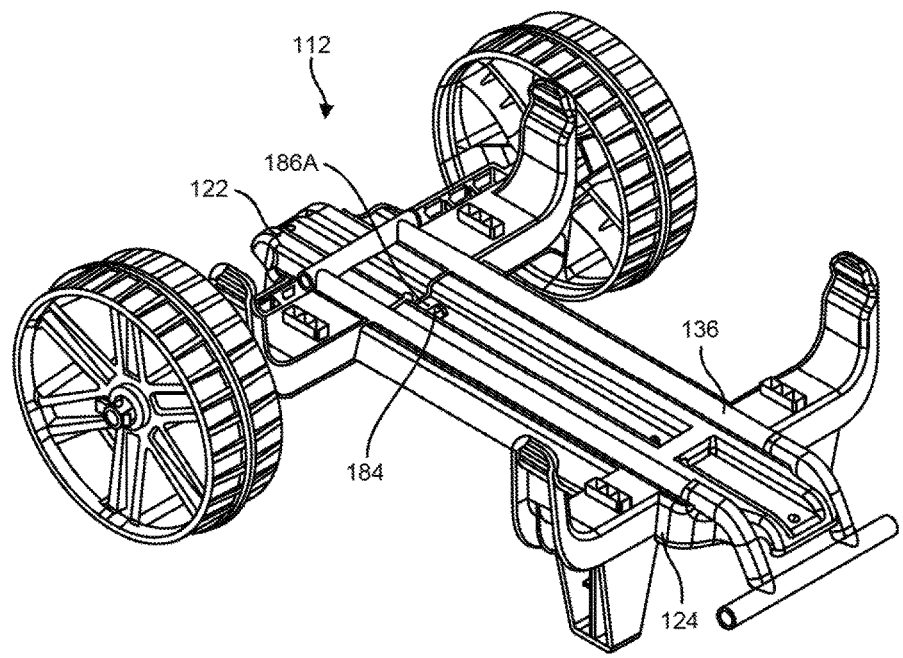
FIG. 57 illustrates an exemplary cart in a first configuration.
Figure 58:
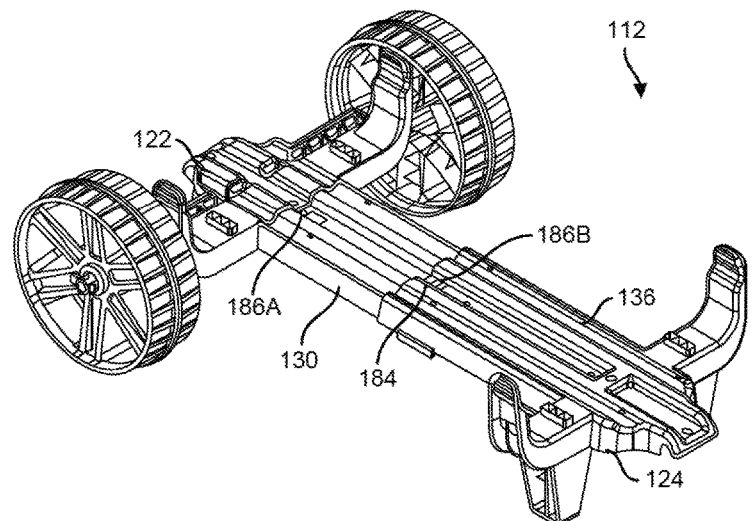
FIG. 58 illustrates the cart of FIG. 57 in a second configuration.

As illustrated in FIG. 57, when the fastener 184 is received in the first connecting aperture 186A, the cart 112 is in a first configuration having a first length. As illustrated in FIG. 58, when the fastener 186 is received in the second connecting aperture 186B, the cart 112 is in a second configuration having a second length.

In some embodiments, the cart 112 may be secured with the fastener 184 and one or more additional fasteners 126, such as illustrated in FIGS. 36 and 47.

The elements, components, and steps described herein are meant to exemplify some types of possibilities. In no way should the aforementioned examples limit the scope of the invention, as they are only exemplary embodiments.

The phrases "in some embodiments," "according to some embodiments," "in the embodiments shown," "in other embodiments," "in one exemplary embodiment," "in some exemplary embodiments," "in some examples," "in other examples," "in some cases," "in some situations," "in one configuration," "in another configuration," and the like generally mean that the particular technique, feature, structure, or characteristic following the phrase is included in at least one embodiment of the present invention and/or may be included in more than one embodiment of the present invention. In addition, such phrases do not necessarily refer to the same embodiments or to different embodiments.

The foregoing disclosure has been presented for purposes of illustration and description. Other modifications and variations may be possible in view of the above teachings. The embodiments described in the foregoing disclosure were chosen to explain the principles of the concept and its practical application to enable others skilled in the art to best utilize the invention. It is intended that the claims be construed to include other alternative embodiments of the invention except as limited by the prior art.

What is claimed is:

1. A cart for transporting an object, the cart comprising:
   a first member including a first wheel and a second wheel, the first member further including at least one support surface positioned at least partially between the first wheel and the second wheel for supporting the object when the object is placed on the cart;
   a second member including a ground contacting member, at least one of the first member and the second member including a first aperture and a second aperture and the other of the first member and the second member including a third aperture; and
   a fastener including a first ledge and a second ledge, the first ledge configured to be received within the first aperture and the second ledge configured to be received within the third aperture to secure the first member to the second member in a first configuration of the cart and the first ledge configured to be received within the second aperture and the second ledge configured to be received within the third aperture to secure the first member to the second member in a second configuration of the cart, the first configuration of the cart having a shorter distance between the first wheel and the ground contacting member than the second configuration of the cart.

2. The cart of claim 1, wherein at least one of the first member and the second member includes a first securing member for attaching the object to the cart, the first securing member including a first clasp formed from a resilient material and configured to engage a first securing member of the object and a second clasp formed from a resilient material and configured to engage a second securing member of the object, wherein the first clasp and the second clasp are configured to resiliently flex away from the object to receive the object.

3. The cart of claim 2, wherein the first securing member includes a first retaining latch configured to engage the first securing member of the object and a first recess adjacent to the first retaining latch and configured to receive the first securing member of the object.

4. The cart of claim 2, wherein the first member includes the first securing member and the second member includes a second securing member, the second securing member including a third clasp formed from a resilient material and configured to engage a second securing member of the object, the second securing member further including a fourth clasp formed from a resilient material and configured to engage a fourth securing member of the object, wherein the third clasp and the fourth clasp are configured to resiliently flex away from the object to receive the object.

5. The cart of claim 2, wherein the first member includes a substantially U-shaped member extending from a first end to a second end, the first end of the U-shaped member including the first clasp and the second end of the U-shaped member including the second clasp.

6. The cart of claim 2, wherein the first clasp further includes a tapered end configured to engage a lower portion of the object to flex the first clasp away from the object to receive the object.

7. The cart of claim 2, wherein the first securing member includes a first recess positioned adjacent to the first clasp and configured to receive the first securing member of the object.

8. The cart of claim 1, wherein the first member includes a first supporting groove configured to receive a first edge surface of the second member and a second supporting groove configured to receive a second edge surface of the second member.

9. The cart of claim 8, wherein the second member further includes a first supporting groove configured to receive a first edge surface of the first member and a second supporting groove configured to receive a second edge surface of the first member.

10. The cart of claim 1, wherein the first member includes a first top surface having a first plurality of grooves and the second member includes a first top surface of a second plurality of grooves, wherein each of the second plurality of grooves is configured to be overlaid on a corresponding groove of the first plurality of grooves.

11. The cart of claim 1, wherein the ground contacting member includes a first leg configured to contact the ground and support the second member.

12. The cart of claim 1, wherein the ground contacting member includes at least one wheel extending from the second member and configured to support the second member.

13. The cart of claim 1, wherein the fastener includes a bridging portion connecting the first ledge and the second ledge.

14. The cart of claim 1, wherein the first ledge is positioned at a height lower than a height of the second ledge.

15. The cart of claim 1, wherein the first ledge is configured to abut a bottom surface of a connecting portion of the first member and the second ledge is configured to abut a bottom surface of a connecting portion of the second member.

16. A cart for transporting an object, the cart comprising:
a handle, the handle having a first end connected to a second end by a length member, the length member including a curved portion, and the second end including a plurality of extensions extending away from the length member; and
a handle attachment portion, the handle attachment portion including a receiver formed from a resilient material and configured to releasably attach the first end of the handle in a first configuration, wherein the receiver is configured to releasably attach to the second end of the handle in a second configuration.

17. The cart of claim 16, wherein the length member and first end of the handle are configured to be positioned against a top surface of the cart when the second end of the handle is attached to the receiver.

18. The cart of claim 16, wherein the length member is configured to be positioned in an aperture of the object to be transported when the handle is in the first configuration.

19. A cart for transporting an object, the cart comprising:
a handle, the handle having a first end connected to a second end by a length member, the length member including a curved portion, and the second end including a plurality of extensions extending away from the length member; and
a handle attachment portion, the handle attachment portion including a receiver formed from a resilient material and configured to releasably attach the first end of the handle in a first configuration, wherein the length member is configured to be positioned in an aperture of the object to be transported when the handle is in the first configuration, and wherein the handle is configured to be positioned in the aperture of the object and the extensions are configured to engage an area of the object surrounding the aperture when the handle is in a second configuration.

20. The cart of claim 19, wherein the object to be transported is a cooler and the aperture is an aperture in a handle of the cooler.

* * * * *